(12) United States Patent
Smith et al.

(10) Patent No.: US 9,183,804 B2
(45) Date of Patent: Nov. 10, 2015

(54) DISPLAY WITH WIDE VIEW ANGLE

(71) Applicant: Sharp Kabushiki Kaisha, Osaka (JP)

(72) Inventors: Nathan James Smith, Oxford (GB); Benjamin John Broughton, Oxford (GB); Christopher James Brown, Oxford (GB); Paul Antony Gass, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 74 days.

(21) Appl. No.: 14/100,691

(22) Filed: Dec. 9, 2013

(65) Prior Publication Data

US 2014/0160177 A1 Jun. 12, 2014

(30) Foreign Application Priority Data

Dec. 12, 2012 (GB) .................................. 1222368.1

(51) Int. Cl.
*G09G 3/36* (2006.01)
*G09G 3/20* (2006.01)
*G02F 1/1343* (2006.01)

(52) U.S. Cl.
CPC ........ *G09G 3/3659* (2013.01); *G02F 1/134363* (2013.01); *G09G 3/2007* (2013.01); *G09G 3/207* (2013.01); *G09G 3/3648* (2013.01); *G09G 2320/028* (2013.01)

(58) Field of Classification Search
CPC . G09G 3/2007; G09G 3/3648; G09G 3/3659; G09G 2300/0426; G09G 2320/028; G09G 2320/068; G09G 3/3696; G09G 3/36; G09G 2300/0434; G09G 2320/0271; G09G 3/3637; G09G 2300/0447; G09G 2300/0456; G09G 2300/0491; G09G 2320/0686; G09G 3/207; G02F 2001/134345; G02F 2001/134381; G02F 1/1323; G02F 2203/30; G02F 1/133753; G02F 1/13; G02F 2001/134318; G02F 2001/1557; G02F 2300/0434; G02F 1/134363; G02F 1/1343
USPC ................................................... 345/690–699
See application file for complete search history.

(56) References Cited

U.S. PATENT DOCUMENTS 3,675,988 A 7/1972 Soref
3,741,629 A 6/1973 Kahn
(Continued)

FOREIGN PATENT DOCUMENTS

EP 1 484 634 A1 12/2004
GB 2 428 152 A 1/2007
(Continued)

*Primary Examiner* — Dwayne Bost
*Assistant Examiner* — Ivelisse Martinez Quiles
(74) *Attorney, Agent, or Firm* — Renner, Otto, Boisselle & Sklar, LLP

(57) ABSTRACT

A display comprises independently addressable pixels, a pixel comprising first and second electrodes (12a,12b) disposed on a first substrate and spaced apart from one another. A counter electrode (22) is provided on a second substrate, with an electro-optical material provided between the first substrate and the second substrate. A controller, in use, applies a first voltage to the first electrode of the pixel, a second voltage different to the first voltage to the second electrode of the pixel, and a third voltage to the counter electrode of the pixel to define in the pixel at least one of a first region (18a), a second region (18c) and a third region (18b). The first, second and third voltages are selected such that an area of the first region, second region and third region or each of the first, second region and third region defined in the pixel produces a desired greyscale level for the pixel.

16 Claims, 22 Drawing Sheets

(56) References Cited

U.S. PATENT DOCUMENTS

| | | | |
|---|---|---|---|
| 4,106,858 A | 8/1978 | Dargent et al. | |
| 4,112,361 A | 9/1978 | Nakada et al. | |
| 4,139,278 A | 2/1979 | Matsumoto et al. | |
| 4,392,718 A | 7/1983 | Morrison | |
| 4,815,823 A | 3/1989 | Kaneko | |
| 4,824,218 A * | 4/1989 | Kuno et al. | 349/37 |
| 4,840,460 A | 6/1989 | Bernot et al. | |
| 5,519,411 A * | 5/1996 | Okada et al. | 345/89 |
| 5,847,688 A | 12/1998 | Ohi et al. | |
| 6,067,063 A | 5/2000 | Kim et al. | |
| 6,801,220 B2 | 10/2004 | Greier et al. | |
| 7,079,214 B2 | 7/2006 | Shimoshikiryo | |
| 2004/0141107 A1* | 7/2004 | Jones | 349/77 |
| 2005/0024548 A1* | 2/2005 | Choi et al. | 349/43 |
| 2005/0200784 A1* | 9/2005 | Kume et al. | 349/130 |
| 2005/0219186 A1 | 10/2005 | Kamada et al. | |
| 2007/0040780 A1* | 2/2007 | Gass et al. | 345/87 |
| 2007/0098918 A1* | 5/2007 | Komitov et al. | 428/1.1 |
| 2007/0146261 A1 | 6/2007 | Matsushima et al. | |
| 2009/0091587 A1* | 4/2009 | Kim et al. | 345/690 |
| 2010/0214324 A1 | 8/2010 | Broughton et al. | |
| 2010/0220043 A1* | 9/2010 | Broughton et al. | 345/87 |
| 2011/0109858 A1* | 5/2011 | Chen et al. | 349/139 |
| 2011/0170030 A1 | 7/2011 | Boote | |
| 2012/0069420 A1* | 3/2012 | Suzuki | 359/270 |
| 2013/0135547 A1 | 5/2013 | Hibayashi et al. | |

FOREIGN PATENT DOCUMENTS

| | | |
|---|---|---|
| JP | 62-289818 | 12/1987 |
| JP | 63-047729 | 2/1988 |
| JP | 2007-171674 | 7/2007 |
| WO | WO 95/15548 A1 | 6/1995 |
| WO | WO 2005/015300 A1 | 2/2005 |
| WO | WO 2012/014751 A1 | 2/2012 |

* cited by examiner

Figure 9
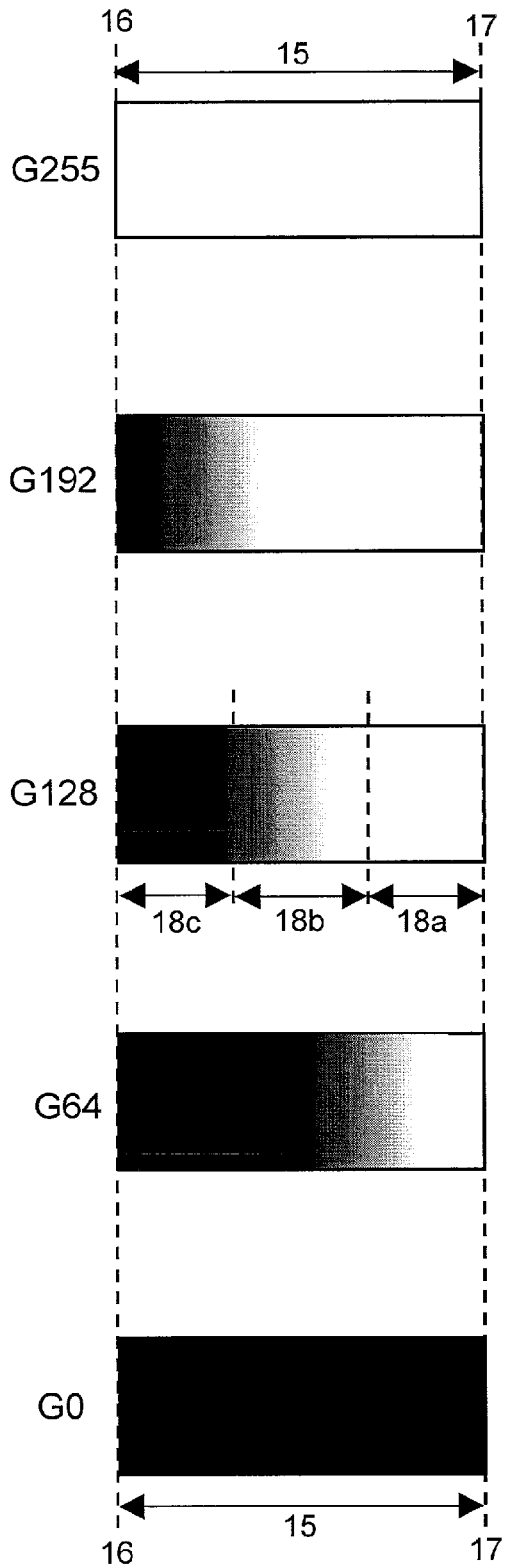
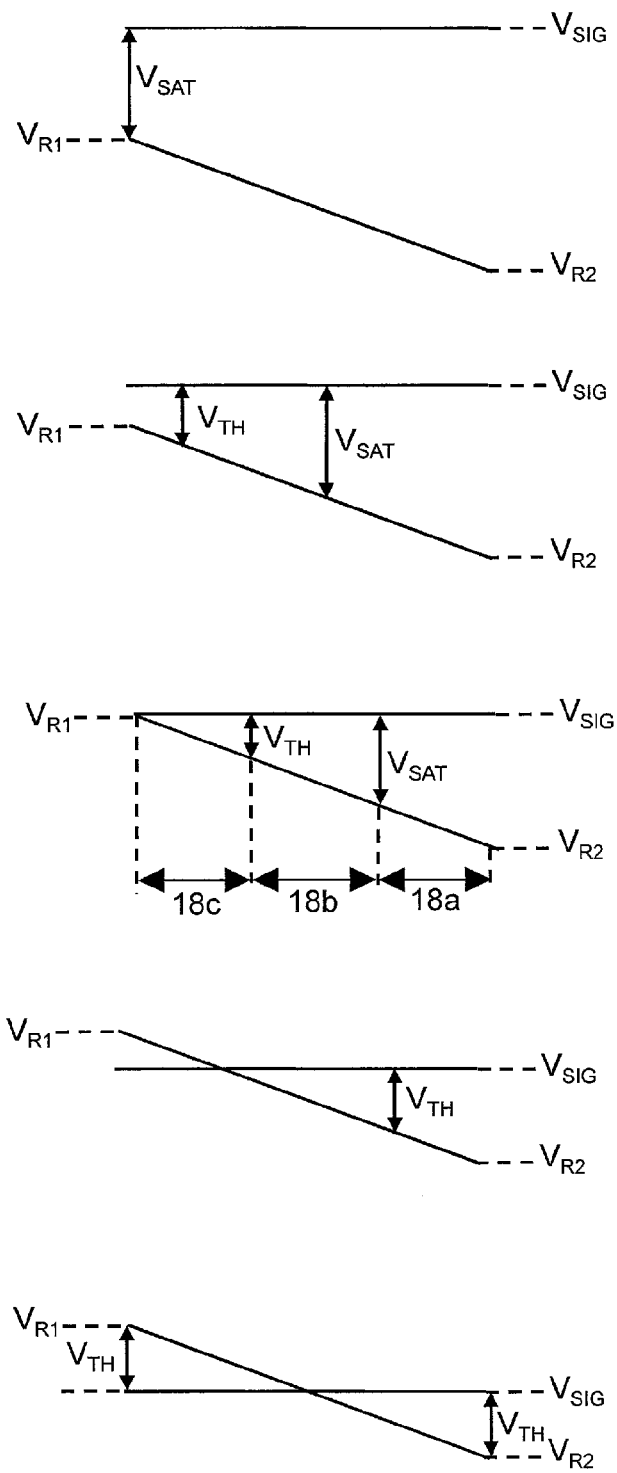

Figure 12: Normal Drive
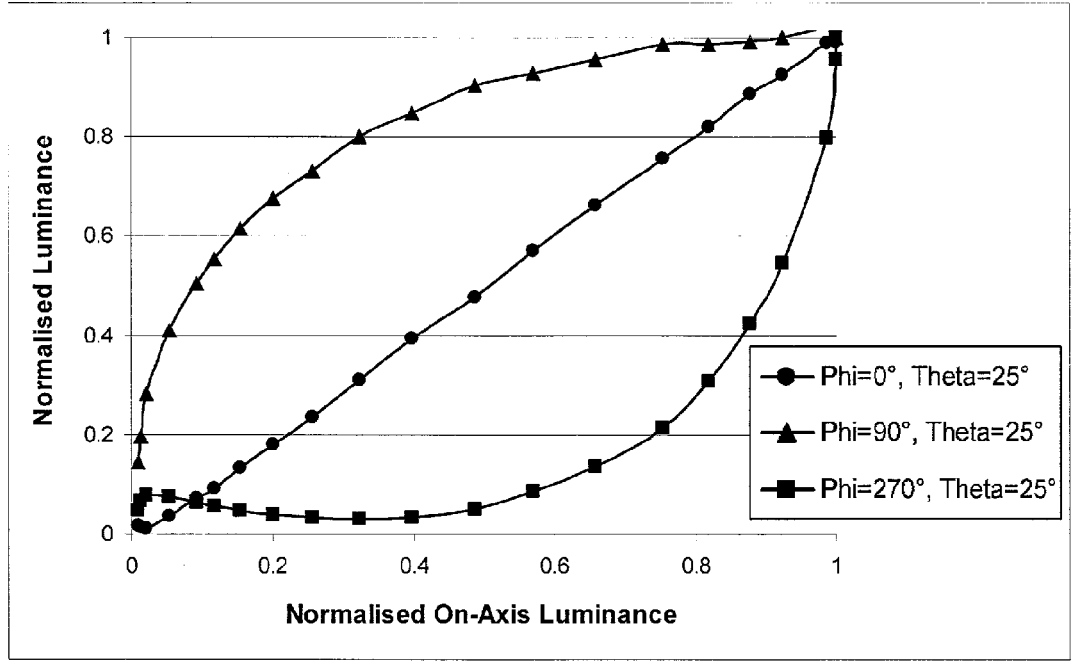
Figure 13: Analogue Multi-Pixel Drive
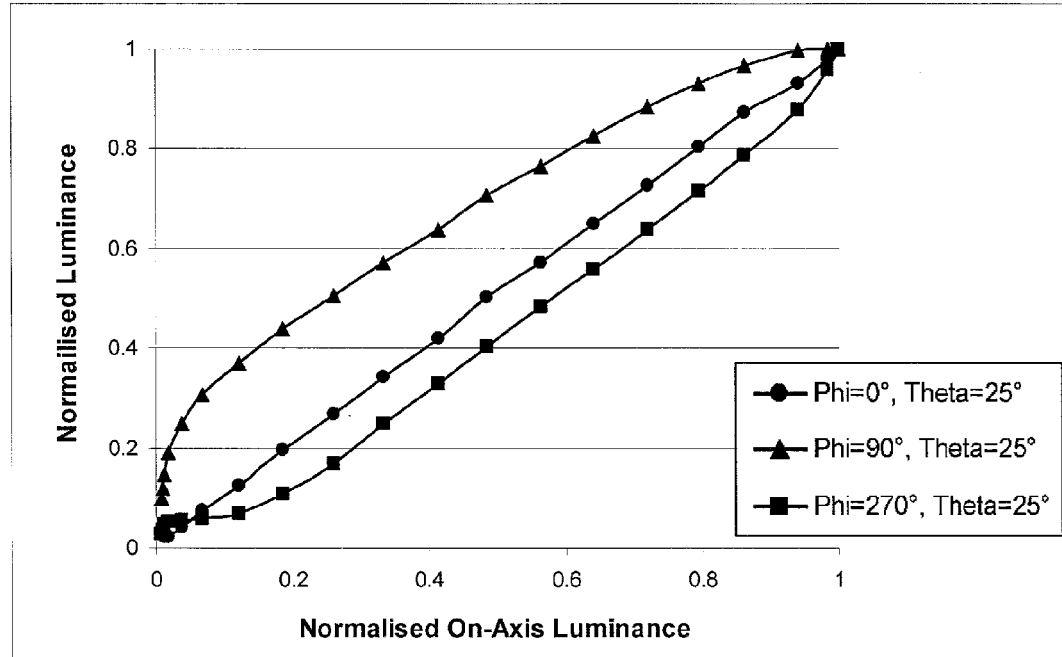

Figure 18: Phi=0°
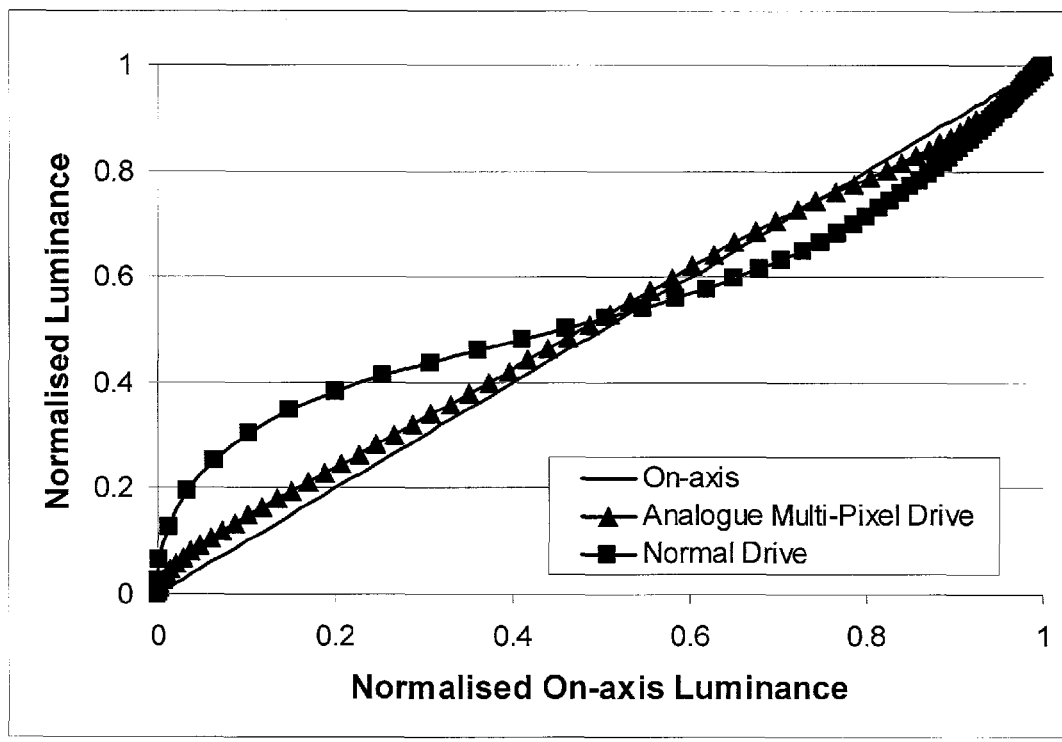
Figure 19: Phi=45°
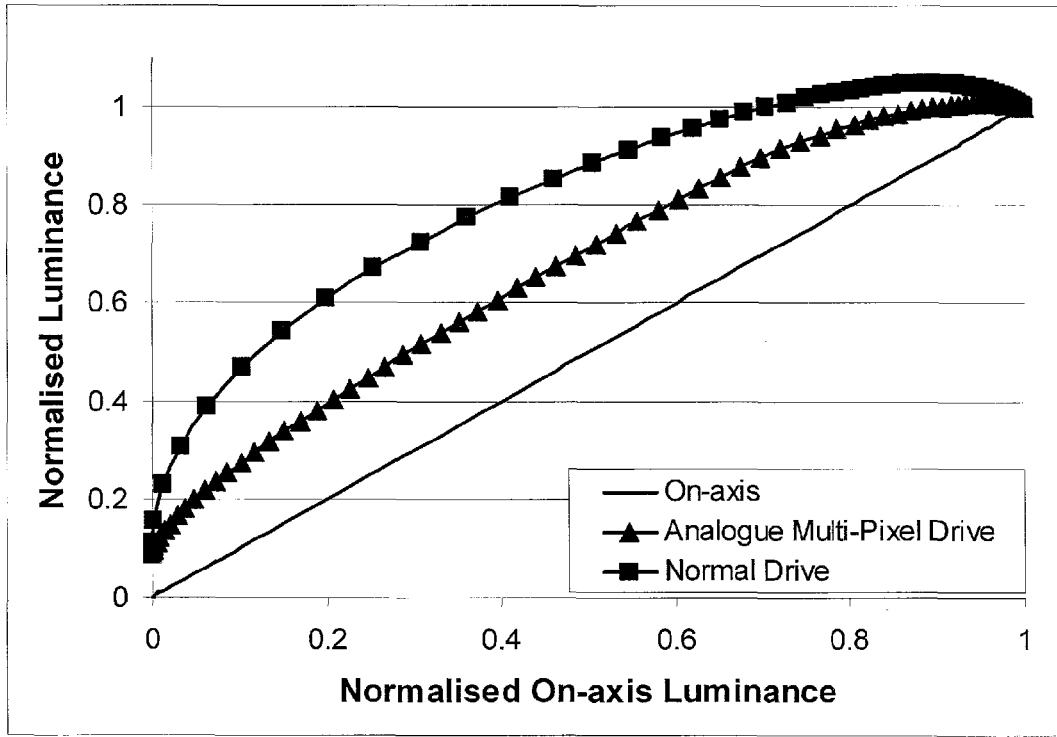

Figure 27
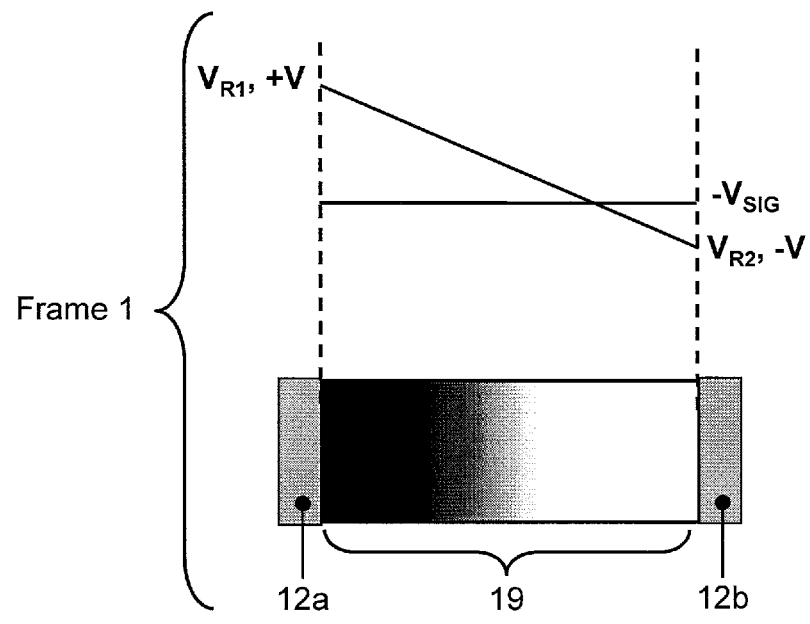
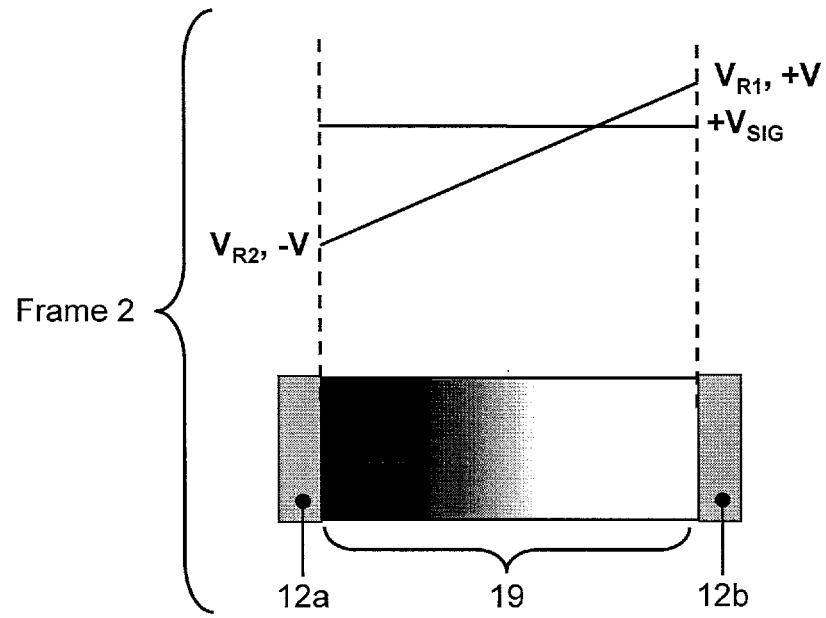

DISPLAY WITH WIDE VIEW ANGLE

This Nonprovisional application claims priority under 35 U.S.C. §119(a) on Patent Application No. 1222368.1 filed in United Kingdom on Dec. 12, 2012, the entire contents of which are hereby incorporated by reference.

FIELD OF THE INVENTION

This invention relates to electrode arrangements and a related method of driving a liquid crystal display in order to improve the viewing angle characteristics of said display.

BACKGROUND OF THE INVENTION

It is desirable for an LCD to have a wide viewing angle so that an image viewed from an off-axis position appears identical to said image when viewed from an on-axis position. In order to improve the wide-view performance of LCDs, several technologies have been developed. Displays have been produced with angular compensation films such as the splayed-discotic Wide-View film for Twisted Nematic (TN) displays, multi-domained pixels for Vertically Aligned Nematic (VAN) and improved electrode geometries. These developments have enabled displays with no contrast inversion problem at wide viewing angles, i.e. although the absolute luminance of a pixel may change with viewing angle, a pixel which is switched to have an on-axis luminance higher than another pixel will remain brighter at all viewing angles, and vice versa. However, the amount of variation in pixel luminance with viewing angle is still a non-linear function of the on-axis pixel luminance in most types of LCD. This has the effect that in a colour display comprising an array of pixels, each of which is composed of a plurality of colour sub-pixels, such as red, green and blue sub-pixels in an RGB stripe display for example, if the pixel is displaying a colour consisting of different luminance values of the three colour components, these different luminance values can shift by a different amount with viewing angle, resulting in a shift in the perceived colour. In essence, the off-axis luminance response has a non-linear relationship with the on-axis luminance response, thus yielding an image that varies with viewing angle. In order to minimise angular dependent colour shift, various technologies have been employed to reduce the degree of non-linearity between the off-axis and on-axis luminance responses.

U.S. Pat. No. 4,840,460, US20050219186A1, U.S. Pat. No. 6,067,063 and U.S. Pat. No. 7,079,214 describe the use of additional electronics to further divide each LCD colour sub-pixel into two (or more) sub-regions (split sub-pixel architecture). Aside from the black level, the first sub-region has a first relatively high luminance value and the second sub-region has a second relatively low luminance value. The average luminance from the first and second sub-regions of the sub-pixel yields the desired luminance of said sub-pixel. Displaying an image in this way reduces the degree of non-linearity between the off-axis and on-axis luminance responses of a sub-pixel, thus minimising angular dependent colour shifts. A disadvantage of these technologies is the reduction in maximum luminance. Maximum luminance is limited by the fact that the second sub-region never reaching its maximum possible luminance. Maximum luminance is also limited by the fact that the additional electronics required to further divide each sub-pixel reduces the overall aperture ratio of the sub-pixel.

U.S. Pat. No. 6,801,220 and U.S. Pat. No. 5,847,688 describe how the optical effect of split sub-pixel architecture can be effectively mimicked by image processing algorithms (running in software or in the LCD control electronics) that negate the need for the additional electronics required to divide each LCD sub-pixel into at least a further two sub-regions. These algorithms may be applied to any existing colour display by adjusting the luminance of whole colour sub-pixels up and down alternately, either in the spatial or temporal domain, to create the same optical effect as split sub-pixel architecture. Luminance is effectively transferred between the colour components of neighbouring pixels rendering no overall luminance change. The disadvantage of this technology is that the algorithms lower the perceived resolution of an image relative to an image that has not been processed by the algorithms.

GB2428152 and US2010214324 describe image processing algorithms (running in software or in the LCD control electronics) that exploit the non-linear relationship between the off-axis luminance response and the on-axis luminance of an LCD in order to create a privacy function. When the privacy function is activated, the image that is viewed on-axis is different from the image that is viewed off-axis.

A first conductive electrode in electrical contact with a second conductive electrode via a third resistive electrode enables a voltage gradient to be formed along the third resistive electrode. The use of this electrode arrangement for forming a voltage gradient to switch liquid crystal (LC) molecules has been disclosed in the literature. WO2005/015300A1 describes the use of a transient voltage gradient to control the direction of the electric field during LC switching in order to avoid the production of disclination lines in the LC layer. EP1484634A1 and US2011/0170030A1 describe the use a voltage gradient to spatially alter the transmission function of a window containing liquid crystal to enable an electronically controllable curtain for said window. U.S. Pat. No. 3,675,988, U.S. Pat. No. 3,741,629A, U.S. Pat. No. 4,139,278, U.S. Pat. No. 4,106,858A, U.S. Pat. No. 4,112,361A, U.S. Pat. No. 4,392,718A all disclose a non-pixelated liquid crystal display device that conveys information via the use of an analogue voltage gradient. U.S. Pat. No. 4,815,823 describes the use of a voltage gradient within each pixel of a ferroelectric liquid crystal display device. The ferroelectric liquid crystal display device is bistable and therefore inherently has only two grey-levels. However, the use of a voltage gradient as described by U.S. Pat. No. 4,815,823 enables continuous control over the transmission of light through each pixel thus enabling more than two grey levels per pixel.

SUMMARY OF THE INVENTION

An aspect of the present invention provides a display comprising: a first substrate; a second substrate spaced from the first substrate; an image display layer disposed between the first substrate and the second substrate and comprising an electro-optical material, the electro-optical material not being a ferro-electric electro-optical material; and a controller; wherein the display comprises a plurality of independently addressable pixels, a pixel of the plurality of pixels comprising: a first electrode and a second electrode disposed on the first substrate, the first electrode being spaced from the second electrode in a direction parallel to a plane of the first substrate; a resistive layer disposed on the first substrate and electrically connected to the first electrode and to the second electrode; and another electrode disposed on the second substrate; the controller, in a first mode, being adapted to, for a pixel of the display, apply a first voltage to the first electrode of the pixel, apply a second voltage different to the first voltage to the second electrode of the pixel and apply a third voltage to the other electrode of the pixel to define in the pixel at least one of a first region in which the electro-optical material is in an unswitched state, a second region in which the electro-optical material is in a fully switched state, and a third region in which the electro-optical material is in a partially switched state, the first, second and third voltages being selected such that an area of the first region, second region and third region or each of the first, second and third regions defined in the pixel produces a desired greyscale level for the pixel.

BRIEF DESCRIPTION OF THE DRAWINGS

FIG. 9: Plan view of a Normally Black LCD pixel, Analogue Multi-Pixel Drive
FIG. 12: $1^{st}$ Minimum TN viewing angle response, Normal Drive
FIG. 13: $1^{st}$ Minimum TN viewing angle response, Analogue Multi-Pixel Drive
FIG. 18: Viewing angle response of a 4-domain VAN
FIG. 19: Viewing angle response of a 4-domain VAN
FIG. 27: DC balancing in a pixel with Analogue Multi-Pixel Drive

DESCRIPTION OF REFERENCE NUMERALS

Figure 1:
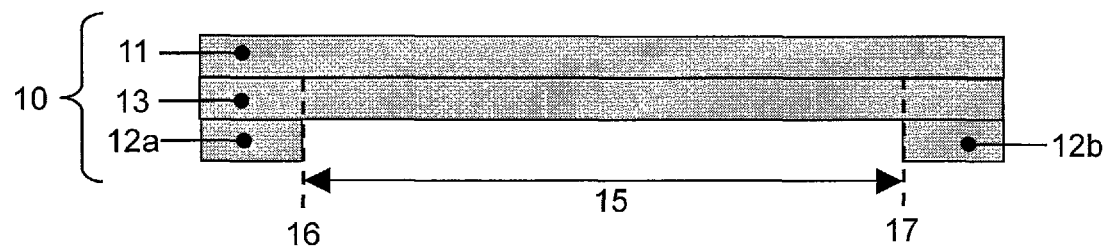
FIG. 1: A first substrate and electrode arrangement

10 A first substrate and electrodes layers
11 A first substrate
12a A first electrode
12b A second electrode
13 A third electrode
15 Region between the first and second electrode
16 Edge of first electrode
17 Edge of second electrode
18a Pixel region that has high luminance
18b Pixel region that has a gradation of luminance
18c Pixel region that has low luminance
19 Sub-Pixel
19a Reflective region of a sub-pixel
19b Transmissive region of a sub-pixel
20 A second substrate and electrodes layers
21 A second substrate
22 A fourth electrode
30 A liquid crystal material (image display layer)
31 Liquid crystal molecule
32 CPA VAN pixel
33 CPA Rivet
34 4-domain VAN pixel
34a A first LC domain of a 4-domain VAN pixel
34b A second LC domain of a 4-domain VAN pixel
34c A third LC domain of a 4-domain VAN pixel
34d A fourth LC domain of a 4-domain VAN pixel
34-1 A first 4-domain VAN pixel
34-2 A second 4-domain VAN pixel
34-3 A third 4-domain VAN pixel
34-4 A fourth 4-domain VAN pixel
40 Polariser
50 Polariser
60 A liquid crystal cell
80 Output Circuit

DETAILED DESCRIPTION OF THE INVENTION

Many Liquid Crystal Displays, such as Twisted Nematic (TN), Super Twisted Nematic (STN), Electrically Controlled Birefringence (ECB), Optically Compensated Birefringence (OCB or "pi-cell") and Vertically Aligned Nematic (VAN) achieve variable light modulation by tilting the LC molecules by a pre-determined amount in a plane perpendicular to the plane of the substrates (i.e. an out-of-plane switching LC mode (out-of-plane switching mode)). An electrode arrangement and related driving method (referred to as "Analogue Multi-Pixel Drive") for out-of-plane switching LCDs are provided that improve the viewing angle performance of said LCDs compared to out-of-plane switching LCDs with a conventional arrangement of electrodes and a conventional driving method (referred to as "Normal Drive"). In essence, the provided electrode arrangement and Analogue Multi-Pixel Drive can be used to improve the viewing angle performance of any out-of-plane switching LC mode (out-of-plane switching mode).

Out-of-plane switching LCDs with a conventional arrangement of electrodes are compatible with image processing algorithms (such as those disclosed in U.S. Pat. No. 6,801,220 and U.S. Pat. No. 5,847,688) in order to further improve viewing angle performance. The provided electrode arrangement and Analogue Multi-Pixel Drive have better viewing angle performance and higher resolution than a display system comprised of an out-of-plane switching LCD with a conventional electrode arrangement and driven according to image processing algorithms (such as those disclosed in U.S. Pat. No. 6,801,220 and U.S. Pat. No. 5,847,688) for enhancing viewing angle performance. As stated above, such image processing algorithms lower the perceived resolution of an image (relative to an image that has not been processed by the algorithms), and this resolution loss is avoided by the present invention since the improved viewing angle performance is obtained in the invention without the use of image processing algorithms.

The electrode arrangement provided is compatible with Analogue Multi-Pixel Drive and Normal Drive. The LCD can be driven with Analogue Multi-Pixel Drive for optimised viewing angle performance or Normal Drive for a reduced viewing angle performance.

The Normal Drive is compatible with image processing algorithms (such as those disclosed in GB2428152 and US2010214324) to further modify the viewing angle performance and create a privacy function. Switching between a high quality wide viewing angle mode and a narrow viewing angle (private) mode is advantageous for mobile displays.

The voltage-luminance curve of an LCD with Analogue Multi-Pixel Drive is significantly more linear than Normal Drive. The relatively linear voltage-luminance curve of the Analogue Multi-Pixel Drive has two advantages over Normal Drive. Firstly, any frame-to-frame variation in pixel signal voltage caused by electrical noise, charge leakage etc. has less impact on the displayed image with the Analogue Multi-Pixel Drive. Secondly, it is easier to reproduce image data accurately with Analogue Multi-Pixel Drive. Consequently, Analogue Multi-Pixel Drive is more compatible with display schemes that employ 10-bit (and higher) data levels per pixel.

The term "unswitched state" refers to the state which the electro-optical material of the display adopts when the voltage applied across the electro-optical material causes no change in the liquid crystal orientation (i.e. when the applied voltage is below the liquid crystal threshold voltage in the case of a liquid crystal electro-optic material. The LC switching threshold voltage of a monostable LC mode can be between ~0.5V and ~2.5V depending upon the LC mode. The switching threshold of some bistable LC modes may be much higher. A typical switching threshold voltage for a TN LC mode is ~1V). When a voltage is applied across the electro-optical material the electro-optical material will adopt a different orientation until it eventually adopts, or tends towards, a final orientation after which a further increase in the magnitude of the applied voltage produces substantially no further change in orientation of the electro-optical material. The final orientation is usually considered as having been obtained when the voltage across the electro-optical material is equal to or greater than the "saturation voltage" of the electro-optical material. In the example of a liquid crystal electro-optic material, the LC saturation voltage can be between ~2V and ~10V and is often defined as the point at which the transmission is at ~95% of the transmission that would occur (for a normally black display) if an infinite voltage was to be applied to the LC material. A state in which the voltage applied across the electro-optical material is equal to or greater than the saturation voltage is referred to as a "fully-switched state". The term "partially switched state" refers to a state in which the magnitude of the voltage applied across the electro-optical material is large enough to cause some change in orientation of the electro-optical material so that the electro-optical material is no longer in its unswitched state, but in which the magnitude of the voltage applied across the electro-optical material is not large enough to cause the electro-optical material to adopt its fully switched state.

For any LC mode that does not display a hysteretic switching characteristic, the voltage required to achieve the "fully-switched state" (i.e. saturation voltage) is greater than the threshold voltage. For any LC mode that does not display a hysteretic switching characteristic, the voltage required to achieve the "partially switched state" is between the threshold voltage and the saturation voltage.

In general, the first region of the pixel (in which the electro-optical material is in an unswitched state), the second region of the pixel (in which the electro-optical material is in its fully switched state), and the third region of the pixel (in which the electro-optical material is in a partially switched state) will have different transmissivities from one another. (In a normally white display for example, the first region will typically have maximum transmissivity, the second region will be maximally attenuating and so have minimum transmissivity, and third region will have an intermediate transmissivity). It is therefore possible to arrange for the pixel to have any desired grey scale level between the brightest greyscale level (usually referred to as "white") and the darkest greyscale level (usually referred to as "black") by selecting the areas of the first, second and third regions in the pixel so that the spatially averaged transmissivity of the pixel gives the desired grey-scale level.

In an out-of-plane switching display an intermediate grey scale level is obtained using a partially-switched liquid crystal state, so that, for an intermediate grey scale level, the liquid crystal molecules have a mid-plane tilt value that is substantially invariant across the pixel and that is intermediate between the tilt angle adopted when the liquid crystal is unswitched and the tilt angle adopted when the liquid crystal is fully switched. In contrast, in the present invention for an intermediate greyscale level only part of a pixel area is in a partially-switched liquid crystal state, with the liquid crystal in the other pixel area(s) being either unswitched and/or fully switched. The mid-plane tilt angle in an intermediate grey-scale level thus varies across a pixel area, with an intermediate mid-plane tilt angle being present only in the part of the pixel where a partially-switched liquid crystal state exists. It has been realised that having the intermediate mid-plane tilt angle present only in part of the pixel leads to an improved viewing angle performance for an intermediate greyscale level, compared to a conventional display in which the intermediate mid-plane tilt angle is substantially present over the whole pixel. (As is known, the viewing properties of a display such as a liquid crystal display are dependent on the viewing angle. Typically, as the viewing angle moves away from the normal axis of the display the properties of the image seen by the observer deteriorate, for example the contrast of the image may reduce (and eventually become reversed) and/or the colours of the image may change. A display has a "viewing angle range" which is the range of viewing angles within which the quality of a displayed image is satisfactory to an observer. The term "viewing angle performance" refers to the extent of the viewing angle range and/or to the image properties within the viewing angle range.)

Unless the context clearly requires otherwise the term "pixel" as used herein is also intended to cover a part of a composite pixel—for example a colour (sub-)pixel in the case of a colour display where (sub-)pixels of two or more colours are arranged to form a composite pixel.

For the avoidance of doubt, the invention does not require that the first electrode and second electrode of a pixel are separate from the first electrode and second electrode of a neighbouring pixel, and one electrode may act as the first or second electrode for a plurality of pixels, for example for a row or column of pixels or even for two adjacent rows or two adjacent columns of pixels.

Figure 2:
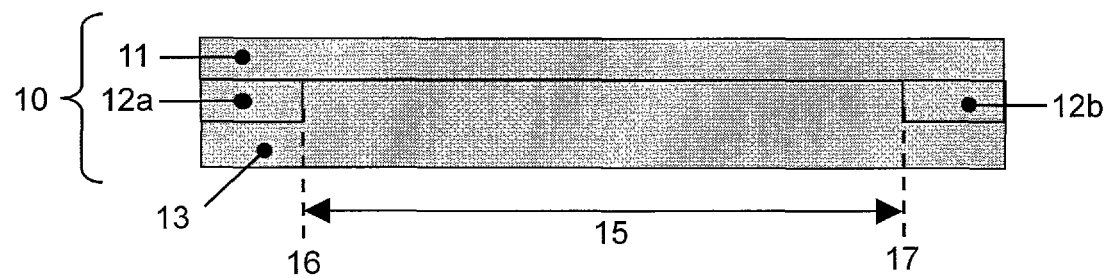
FIG. 2: A first substrate and electrode arrangement

With reference to FIG. 1 and FIG. 2, a first substrate and related electrode arrangements 10 (A first substrate and electrodes layers 10) is comprised of a first substrate 11, a first electrode 12a, and a second electrode 12b disposed on the first substrate, and a resistive layer (in this example constituted by a third electrode 13), also disposed on the first substrate. The first electrode 12a and second electrode 12b are in electrical contact with each other via the third electrode 13. With reference to FIG. 1, the third electrode 13 may be deposited on the first substrate 11 with the first electrode 12a and second electrode 12b deposited on top of the third electrode 13. With reference to FIG. 2, the first electrode 12a and the second electrode 12b may be deposited on the first substrate 11 with the third electrode 13 deposited on top of the first and second electrodes. A liquid crystal alignment layer (not shown) is deposited on top of the electrode(s). The first electrode 12a and second electrode 12b may be independently addressed. A first voltage, $V_{R1}$, may be applied to the first electrode 12a and a second voltage, $V_{R2}$, may be applied to the second electrode 12b, for example by a suitable controller (not shown). If the first and second voltages are the same (i.e. $V_{R1}=V_{R2}$), then this voltage also appears on the third electrode 13 at all lateral positions 15 (Region between the first and second electrode 15) along the third electrode 13. If the first voltage $V_{R1}$ and the second voltage $V_{R2}$ are different (i.e. $V_{R1} \neq V_{R2}$), then a voltage gradient appears along the lateral extent 15 of the third electrode 13 causing the third electrode 13 to have the first voltage $V_{R1}$ at position 16 (Edge of first electrode 16) and the second voltage $V_{R2}$ at position 17 (Edge of second electrode 17). Region 15 illustrates the spatial extent of the voltage gradient that appears on the third electrode. If the third electrode 13 has a uniform resistance between positions 16 and 17 then a voltage gradient with a linear functional form will exist between positions 16 and 17 on the third electrode 13. The region 15 may approximately correspond to the spatial extent of a pixel aperture or a sub-pixel aperture within a liquid crystal display (LCD).

Figure 3:
FIG. 3: A second substrate and electrode arrangement
Figure 30:
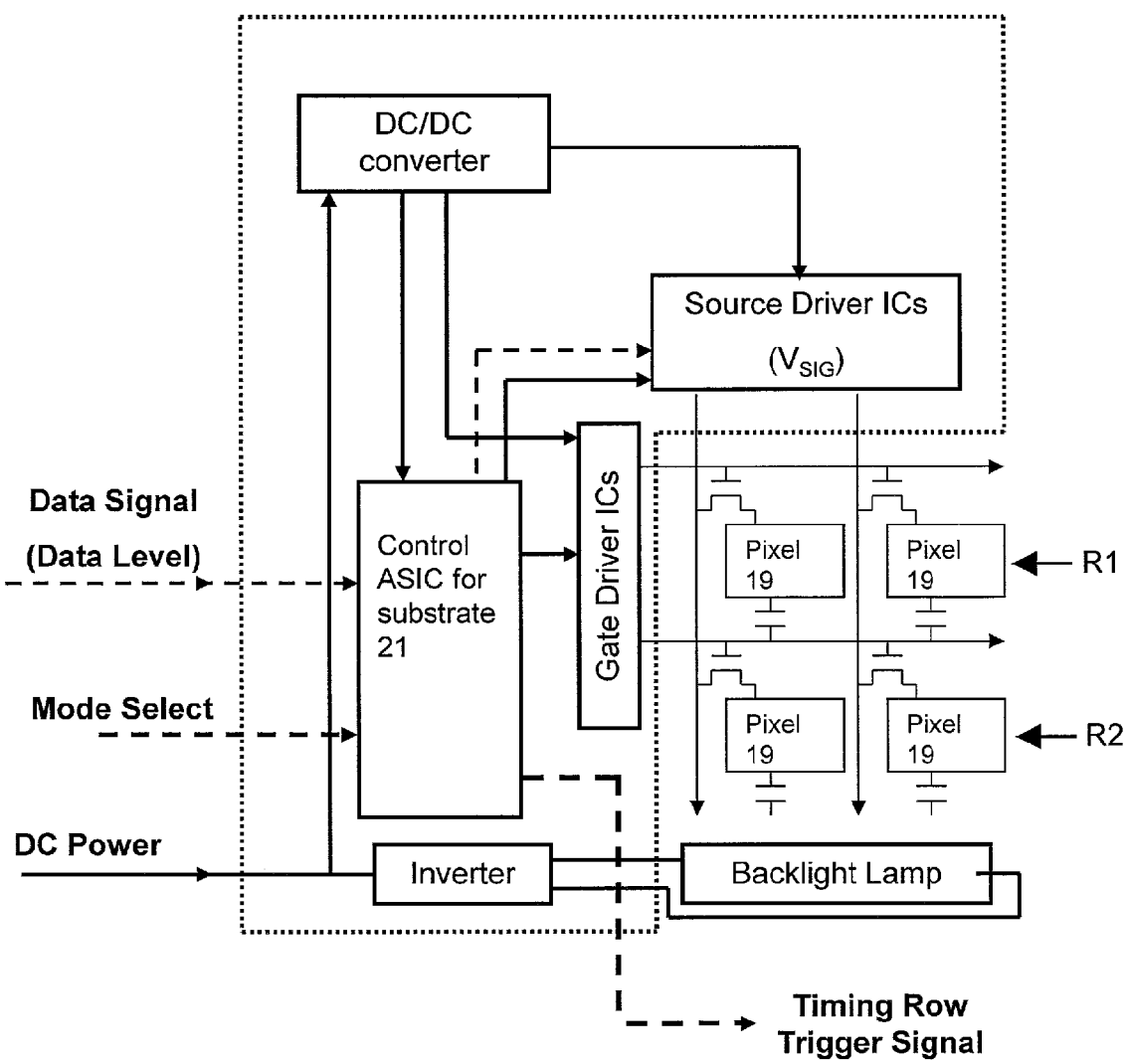
FIG. 30: Liquid Crystal Display with associated drive electronics

With reference to FIG. 3, a second substrate and related electrode arrangement 20 (A second substrate and electrodes layers 20) is comprised of a second substrate 21 and at least another electrode (in this example a fourth electrode 22) disposed on the second substrate. A liquid crystal alignment layer (not shown) is deposited on top of the electrode(s). The fourth electrode 22 is the signal electrode to which a voltage $V_{SIG}$ is applied. (An example of a suitable controller for applying the first voltage, $V_{R1}$, to the first electrode 12a, the second voltage, $V_{R2}$, to the second electrode, and the voltage $V_{SIG}$ to the further electrode 22, is given below with reference to FIGS. 30-32.) In an LCD comprised of multiple pixels, $V_{SIG}$ may be applied to the fourth electrode of a given pixel or sub-pixel via a standard arrangement of Thin Film Transistors (TFT) and associated drive electronics as shown in FIG. 30.

Figure 4:
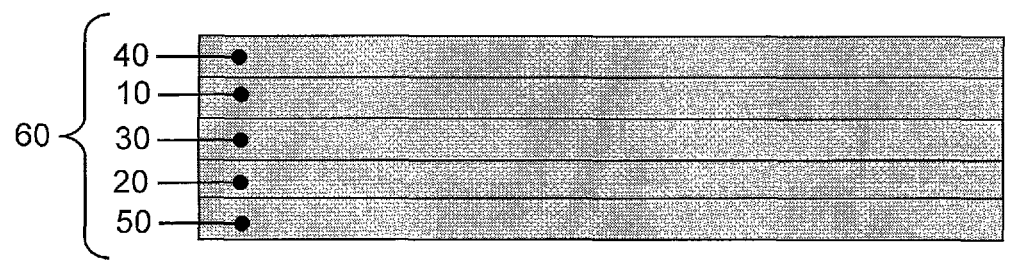
FIG. 4: A liquid crystal display

With reference to FIG. 4, the first substrate and electrode arrangement 10 and the second substrate and electrode arrangement 20 are spaced apart by a predetermined amount, with liquid crystal alignment layers (not shown) facing each other. An image display layer constituted by an electro-optical material such as liquid crystal material 30 is contained between the first substrate and electrode arrangement 10 and the second substrate and electrode arrangement 20 in order to realise an LCD 60 (A liquid crystal cell 60) (The invention will be primarily described with reference to embodiments in which the image display layer is layer of a liquid crystal material). The LCD has polarisers 40, 50 attached to the outermost faces of the first substrate 11 and second substrate 22 respectively. The polarisers may be linear polarisers or circular polarisers. If linear polarisers are employed, the linear polarisers may be arranged parallel to each other or orthogonal to each other or at a pre-determined angle to each other, as is the case in a Super Twisted Nematic (STN) LCD. If circular polarisers are employed, both circular polariser may be of the same handedness or of opposite handedness. Optical compensation films (not shown), for example, negative C-plate(s) and/or positive A-plate(s) etc. may be situated in the optical stack between the polarisers 40, 50. A backlight unit (not shown) illuminates the LCD. The backlight unit may be placed in proximity to either polariser 40 or polariser 50. The LCD has driver electronics (not shown) that provide electrical signals via the first, second and fourth electrodes to the pixels of the LCD such that an image is formed on the LCD. Details of the driver electronics and drive scheme will de discussed later.

Figure 5:
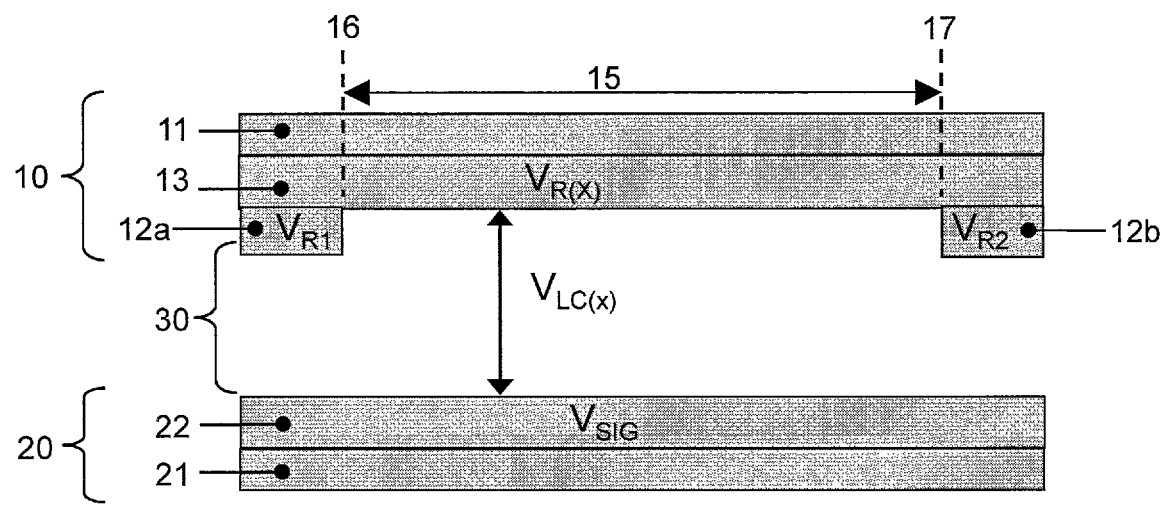
FIG. 5: Definition of electrode voltage labels

With reference to FIG. 5, the voltage labels $V_{R1}$ (voltage on first electrode 12a), $V_{R2}$ (voltage on second electrode 12b) and $V_{SIG}$ (voltage on fourth electrode 22) are shown. The voltage on the third electrode 13, $V_{R(X)}$, may vary laterally in the x-direction from position 16 to position 17. $V_{R(X)}$ is a function of $V_{R1}$ and $V_{R2}$ and the material comprising electrode 13. For example, if $V_{R1}=-V_{R2}$ and the third electrode 13 has uniform resistance in the x-direction, then $V_R=0V$ at the mid-point between position 16 and position 17. The voltage across the LC layer, $V_{LC(X)}$, is given by $V_{SIG}-V_{R(X)}$. If $V_{R1}=V_{R2}$ then $V_R$ is not a function of position and therefore $V_{LC}$ also has substantially no spatial dependence within region 15.

The liquid crystal display of FIG. 4 is capable of being operated at least in a first mode being an "Analogue Multi-Pixel drive" mode, and optionally is also capable of being operated in a second mode being a "normal drive" mode. In the first mode the controller, for a pixel of the display, applies a first voltage (VR1) to the first electrode 12a of the pixel, applies a second voltage (VR2) different to the first voltage to the second electrode 12b of the pixel and applies a third voltage (VSIG) to the another electrode (ie, the fourth electrode 22) of the pixel to define in the pixel at least one of a first region in which the electro-optical material is in an unswitched state, a second region in which the electro-optical material is in a fully switched state and a third region in which the electro-optical material is in a partially switched state. The first, second and third voltages are selected such that an area of the first region, second region and third region or each of the first region, second region and third region defined in the pixel produces a desired greyscale level for the pixel (as defined by input data for that pixel). In the second mode, if provided, the controller is adapted to, for at least one pixel, apply a first voltage (VR1) to the first electrode of the pixel and apply a second voltage (VR2) equal to the first voltage to the second electrode of the pixel.

Figure 6:
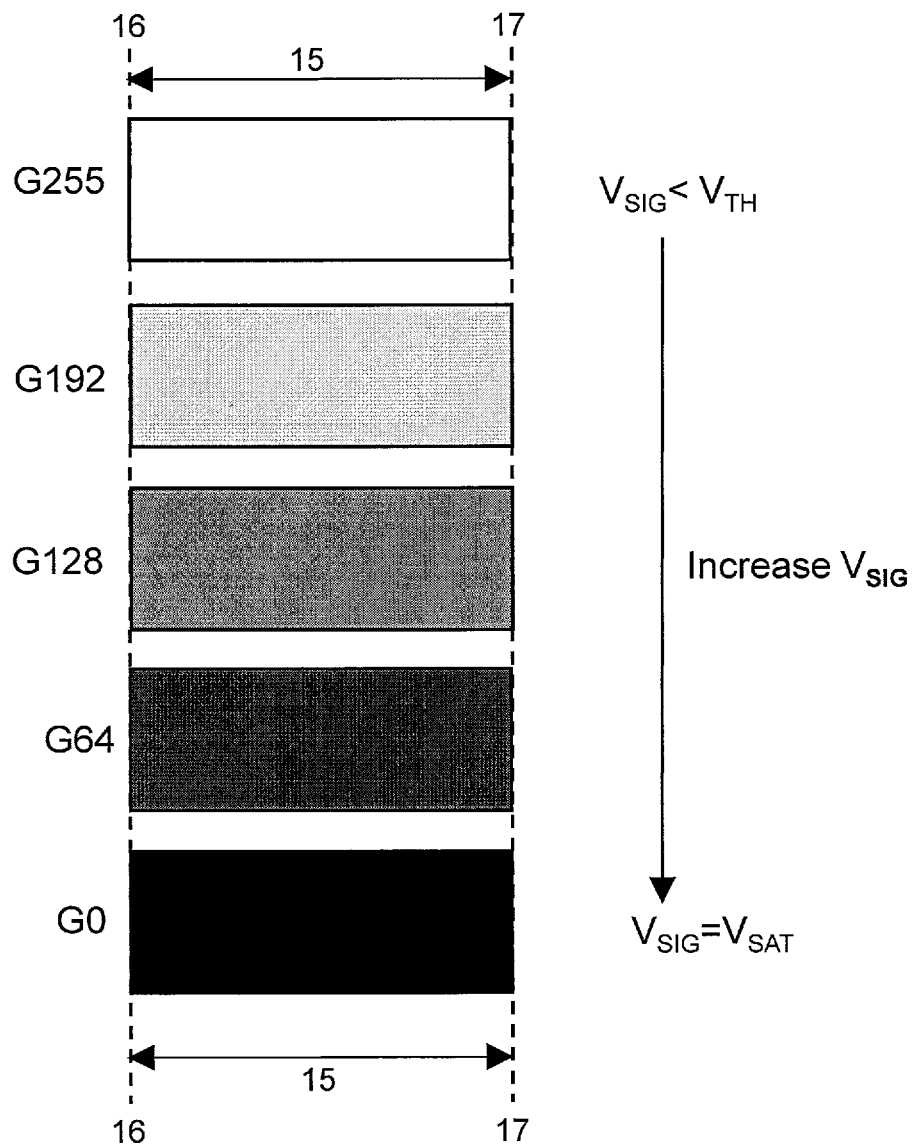
FIG. 6: Plan view of a Normally White LCD pixel, Normal Drive

FIG. 6 depicts a Normally White LC pixel subject to Normal (i.e. conventional) Driving. With reference to FIG. 6, $V_{R1}=V_{R2}=0V$ and $V_{TH}$ is the threshold switching voltage of the image display layer (i.e., the threshold switching voltage of the liquid crystal layer in this example) and $V_{SAT}$ is the liquid crystal saturation voltage. The labels G0, G64, G128, G192 and G255 indicate an approximate data level (grey level) value for an 8-bit driving scheme. Unless stated otherwise, all examples of addressing schemes contained herein have 256 data levels (from G0 to G255) per pixel or sub-pixel (i.e. 8-bit data levels per pixel or sub-pixel). As $V_{SIG}$ is increased from a value less than or equal to $V_{TH}$, to a value substantially equal to $V_{SAT}$, assuming an 8-bit addressing scheme the pixel luminance changes from a maximally light-transmissive, state (G255) to grey (G192, G128, G64) to a maximally light-absorbing state (G0). For convenience, the terms "white" and "black" will be used in place of "maximally light-transmissive" and "maximally light-absorbing".

For a mono-domain LC mode, the pixel luminance is substantially invariant across region 15 for Normal (conventional) Driving. For a mono-domain and multi-domain LC modes, the mid-plane tilt is substantially invariant across region 15 for Normal (conventional) Driving. The mid-plane is defined as a plane at d/2, where d is the LC layer 30 thickness. The pixel shown in FIG. 6 may be used in conjunction with standard colour filters in order to yield a coloured sub-pixel of an LCD.

Figure 7:
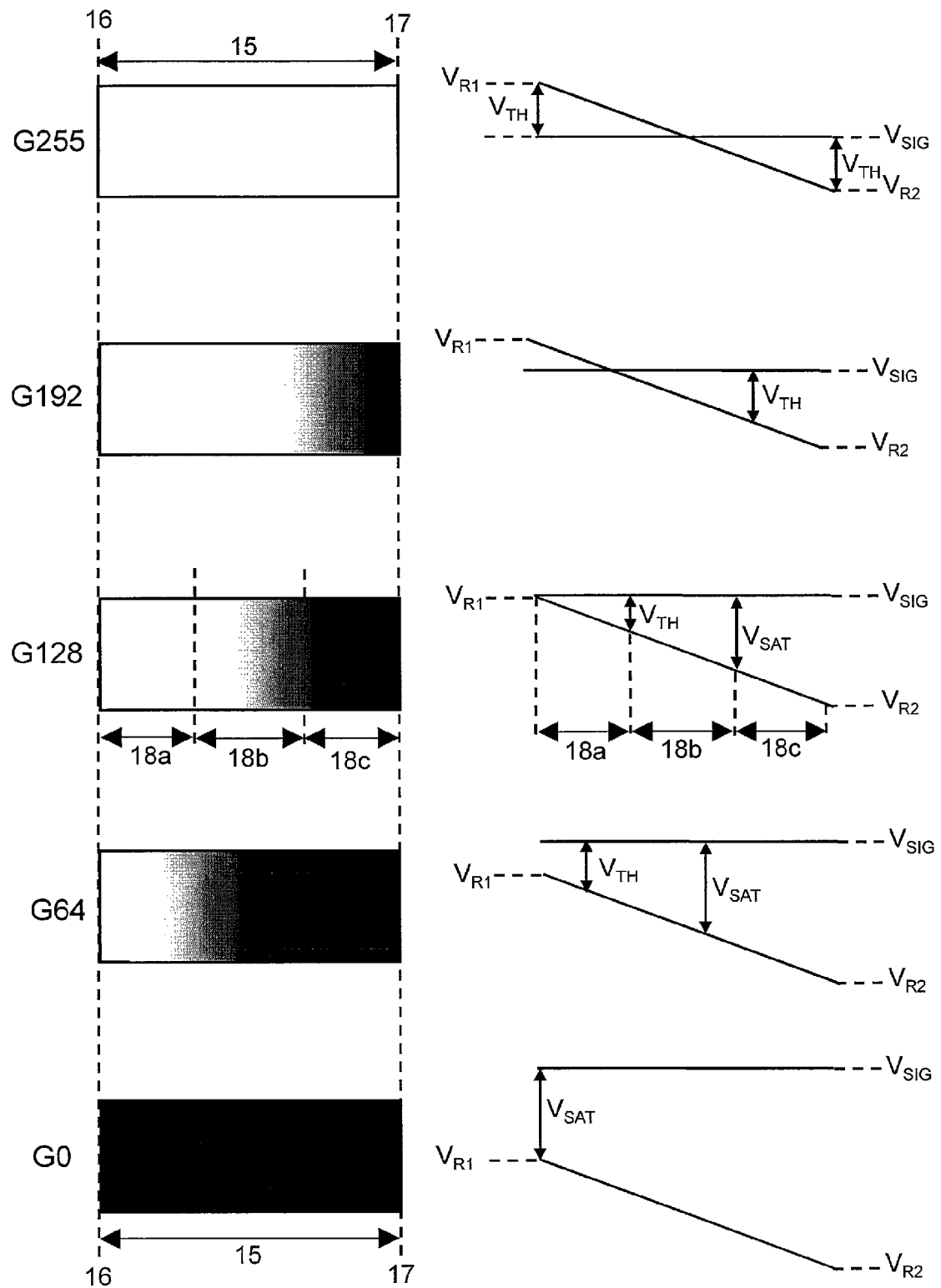
FIG. 7: Plan view of a Normally White LCD pixel, Analogue Multi-Pixel Drive

FIG. 7 depicts a Normally White LC pixel subject to Analogue Multi-Pixel (i.e. unconventional) Driving. FIG. 7 and abstractions thereof are for illustrative purposes only and not drawn to scale. With reference to FIG. 7, $V_{R1}<V_{TH}$, $V_{R2}<V_{TH}$ and $V_{R1}=-V_{R2}$. When $V_{SIG}=0V$ then the voltage across the liquid crystal 30 layer, $V_{LC}(x)$, is $<=V_{TH}$ for all spatial positions across the pixel and therefore the pixel appears substantially white throughout region 15, corresponding to data level G255. When $V_{SIG}$ is increased the pixel luminance is no longer invariant across region 15. For first spatial regions 18a within the pixel whereby $|V_{SIG}-V_{R1}|<V_{TH}$, the liquid crystal material is unswitched and the pixel is substantially white (since a region of unswitched liquid crystal material in a normally-white display appears white). For second spatial regions 18c within the pixel whereby $|V_{SIG}|>=V_{SAT}$, the liquid crystal material is fully switched and the pixel is substantially black. For third spatial regions 18b within the pixel whereby $V_{TH}<|V_{SIG}|<V_{SAT}$, the liquid crystal material is in a partially switched state and the pixel has a graded luminance. With reference to the conventional driving scheme of FIG. 6, for all data levels from G1 to G254 (that is, for all data levels apart from the "white" and "black" levels) the liquid crystal layer of a pixel or sub-pixel comprises a substantially uniform intermediate liquid crystal state (corresponding to the graded luminance region 18b of FIG. 7) over its entire area. In contrast, in the driving scheme of FIG. 7, the pixel may be comprised entirely of region 18a (i.e., for G255). With reference to FIG. 7, the pixel may be comprised entirely of region 18a and 18b (for grey levels just below G255, for example G254 and G253). With reference to FIG. 7, the pixel may be comprised entirely of regions 18a and 18b and 18c (for mid grey levels, for example G128). Alternatively, although not shown in FIG. 7, the pixel may be comprised entirely of region 18b (for mid grey levels, for example G128). A pixel exhibiting a mid grey level, for example of G128, that is comprised entirely of region 18b has better viewing angle performance than a conventional pixel exhibiting the same mid grey level (G128) as shown in FIG. 6. The reason for the improved viewing angle performance is that, even though the entire pixel is comprised entirely of the partially switched region 18b, the liquid crystal state is not uniform over the pixel owing to the voltage gradient between the first electrode and the second electrode. A mid-plane tilt of around ~45° (as used to obtain the G128 level in FIG. 6) has a maximally worst viewing angle performance. As the mid-plane tilt is increased above ~45° or decreased below ~45°, the viewing angle performance improves. In the limit, the best viewing performance of a mid grey level occurs for a pixel comprised entirely of just the fully-switched state and the fully-unswitched state (i.e. no partially-switched state). However, a pixel exhibiting a mid grey level, for example of G128, that is comprised entirely of region 18b according to the invention still has better viewing angle performance because of the area of the pixel that has the mid-plane tilt angles most detrimental for viewing angle performance (i.e. ~45°) is smaller than that a conventional pixel exhibiting the same mid grey level (G128). In other words and for example, the viewing angle performance of a pixel at a mid-grey level that is comprised of two areas with the first area having a mid-plane tilt of ~25° and the second area having a mid-plane tilt of ~75° will have better viewing angle performance than a pixel at the same mid grey level comprised of a single area with a single mid-plane tilt of ~45°. Although the region 18b is comprised of a continuous distribution of mid-plane tilt angles, the area devoted to the mid-plane tilt of around ~45° (that has a maximally worst viewing angle performance) has been minimised. With reference to FIG. 7, the pixel may be comprised entirely of regions 18b and 18c (for grey levels just above G0, for example, G1 and G2). With reference to FIG. 7, the pixel may be comprised entirely of region 18c. (i.e. G0). The use of the regions 18a, 18b and 18c are therefore employed within a pixel or sub-pixel to yield all the grey levels from black to white. To obtain a desired grey level, the pixel or sub-pixel may be comprised of one, two or three of the regions 18a, 18b and 18c. For a mono-domain and multi-domain LC modes, the mid-plane tilt may vary substantially across region 15 when subject to this Analogue Multi-Pixel Drive (for example, see G192, G128 and G64). The pixel shown in FIG. 7 may be used in conjunction with standard colour filters in order to yield a coloured sub-pixel of an LCD.

Figure 8:
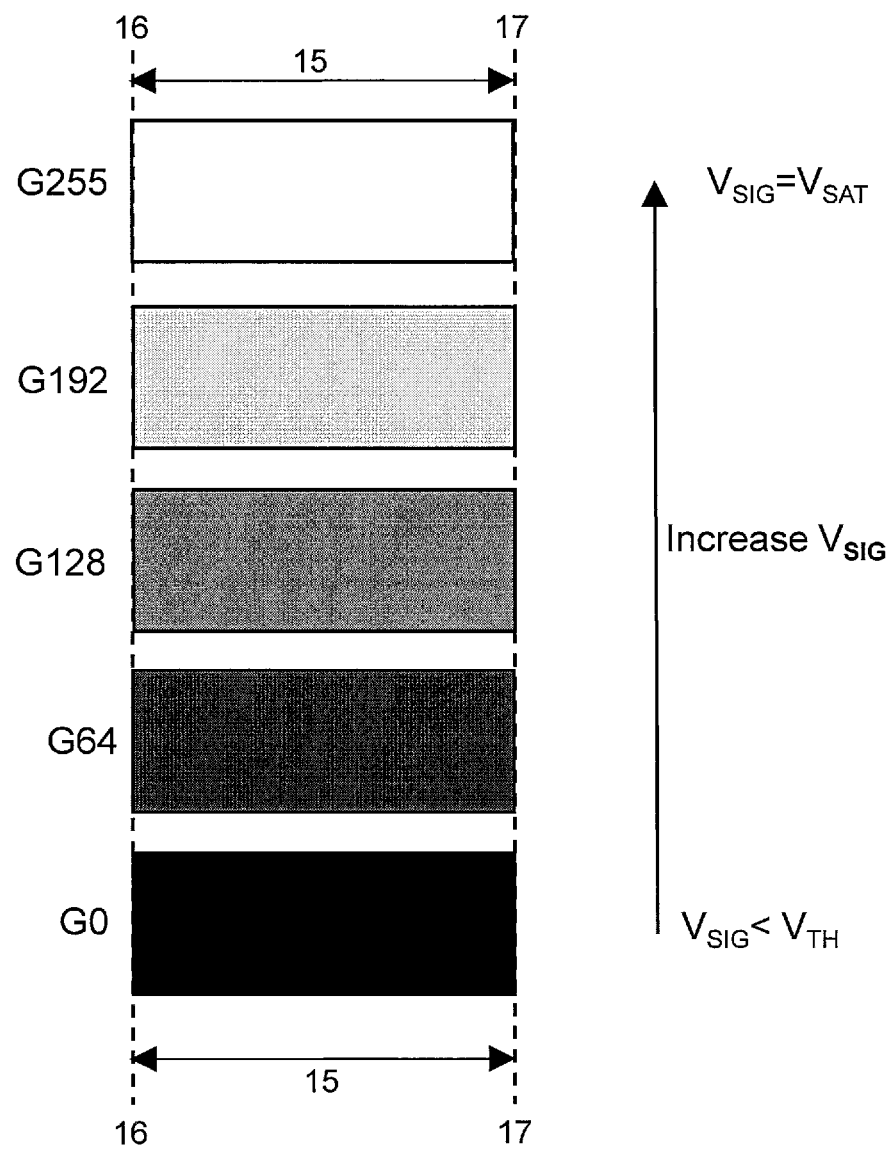
FIG. 8: Plan view of a Normally Black LCD pixel, Normal Drive

FIG. 8 depicts a Normally Black LC pixel that is driven in a Normal (conventional) manner that is analogous to the description provided for FIG. 6. FIG. 9 depicts a Normally Black LC pixel that is driven in an analogue Multi-Pixel Drive (unconventional) manner that is analogous to the description provided for FIG. 7. FIG. 9 and abstractions thereof are for illustrative purposes only and not drawn to scale. With reference to FIG. 9, $V_{R1}<=V_{TH}$, $V_{R2}<=V_{TH}$ and $V_{R1}=-V_{R2}$. When $V_{SIG}=0V$ then the voltage across the liquid crystal 30 layer, $V_{LC}(x)$, is $<=V_{TH}$ for all spatial positions across the pixel and therefore the pixel appears substantially black throughout region 15, corresponding to data level G0. When $V_{SIG}$ is increased the pixel luminance is no longer invariant across region 15. For first spatial regions 18c within the pixel whereby $|V_{SIG}-V_{R1}|<V_{TH}$, the liquid crystal material is unswitched and the pixel is substantially black (since a region of unswitched liquid crystal material in a normally-black display appears black). For second spatial regions 18a within the pixel whereby $|V_{SIG}|>=V_{SAT}$, the liquid crystal material is fully switched and the pixel is substantially white. For third spatial regions 18b within the pixel whereby $V_{TH}<|V_{SIG}|<V_{SAT}$, the liquid crystal material is in a partially switched state and the pixel has a graded luminance.

For the conventional drive scheme of FIG. 8, for all data levels from G1 to G254 (that is, for all data levels apart from the "white" and "black" levels) the liquid crystal layer of a pixel or sub-pixel comprises an intermediate liquid crystal state (corresponding to the graded luminance region 18b of FIG. 7 or 9) over its entire area. In contrast, in the driving scheme of FIG. 9, the pixel may be comprised entirely of region 18a (i.e. G255). With reference to FIG. 9, the pixel may be comprised entirely of region 18a and 18b (for grey levels just below G255, for example 6254 and G253). With reference to FIG. 9, the pixel may be comprised entirely of regions 18*a* and 18*b* and 18*c* (for mid grey levels, for example, G128). Alternatively, although not shown in FIG. 9, the pixel may be comprised entirely of region 18*b* (for mid grey levels, for example G128). With reference to FIG. 9, the pixel may be comprised entirely of regions 18*b* and 18*c* (for grey levels just above G0, for example, G1 and G2). With reference to FIG. 9, the pixel may be comprised entirely of region 18*c* (i.e. G0). For a mono-domain and multi-domain LC modes, the mid-plane tilt may vary substantially across region 15 when subject to this Analogue Multi-Pixel Drive (for example, see G192, G128 and G64). The pixel shown in FIG. 9 may be used in conjunction with standard colour filters in order to yield a coloured sub-pixel of an LCD. The use of the regions 18*a*, 18*b* and 18*c* are therefore employed within a pixel or sub-pixel to yield all the grey levels from black to white. A desired grey level may be comprised of one, two or three of the regions labelled 18*a*, 18*b* and 18*c*. For a mono-domain and multi-domain LC modes, the mid-plane tilt may vary substantially across region 15 when subject to this Analogue Multi-Pixel Drive (for example, see G192, G128 and G64). The pixel shown in FIG. 9 may be used in conjunction with standard colour filters in order to yield a coloured sub-pixel of an LCD.

Figure 10:
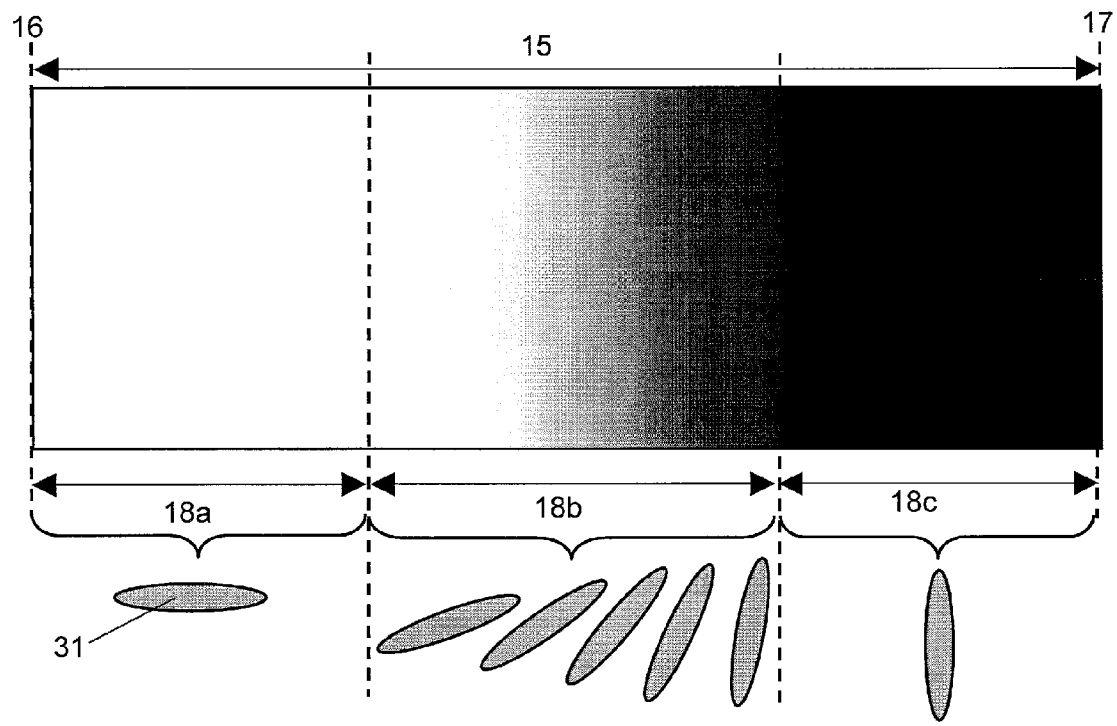
FIG. 10: Mid-plane tilt of LC pixel molecules in an Analogue Multi-Pixel Drive
Figure 11:
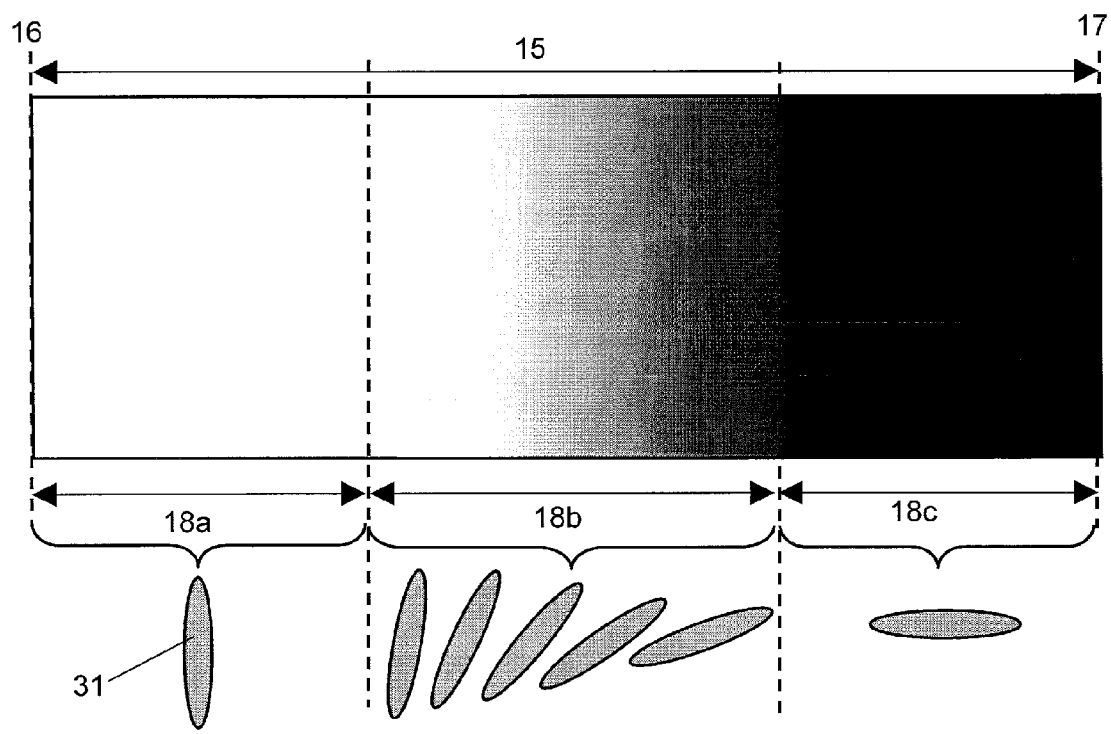
FIG. 11: Mid-plane tilt of LC pixel molecules in an Analogue Multi-Pixel Drive

FIG. 10 and FIG. 11 show examples of how the mid-plane tilt of the LC molecules 31 may vary across region 15 that approximately corresponds to the pixel aperture or sub-pixel aperture. With reference to FIG. 10, the LC molecules in region 18*a* have a low mid-plane tilt and the LC molecules in region 18*c* have a high mid-plane tilt and the LC molecules in region 18*b* have a grading of intermediate tilts. The mid-plane tilt of the molecules in region 18*a* may correspond to the pre-tilt induced by the LC surface alignment layer. The mid-plane tilt of the molecules in region 18*c* may correspond to the pre-tilt induced by the LC surface alignment layer. Although FIG. 11 shows a different spatial arrangement of LC mid-plane tilts than FIG. 10, both FIG. 11 and FIG. 10 include region 18*b* that exhibit a grading of intermediate tilts.

A Normally White 1st Minimum Twisted Nematic LC switch cell was fabricated according to the design as shown in FIG. 5. The LC material used was MLC-2101 (Merck, $\Delta n=0.0943$, $\Delta\epsilon=+18.1$) and cell thickness was ~5 µm. The LC alignment layer was PI2555 (DuPont MicroSystems) which gave a low surface pretilt of ~1°. A chiral dopant, R811 (Merck) was added to the LC material before injection into the LC cell, the resulting mixture had a pitch of ~100 µm. The handedness of the chiral LC mixture cooperated with the handedness induced by the perpendicular rubbed surfaces of the alignment layers. An Indium Gallium Zinc Oxide layer was used for the third electrode 13 and was deposited onto a first substrate 11. The Indium Gallium Zinc Oxide sheet resistance was ~$10^6$ Ω/square. Any transparent material with a suitable sheet resistance may be used for the third electrode 13. The sheet resistance of the third electrode 13 may be in the range ~$10^5$ Ω/square to ~$10^{13}$ Ω/square. A higher sheet resistance causes a lower current to flow in the third electrode 13 and hence a lower power consumption is realised. Lowering the power consumption is desirable, especially for mobile LCD applications. However, a higher sheet resistance may slow down the LC switching speed owing to capacitive coupling with the fourth electrode. To a first order approximation, the capacitive coupling effects become significant when the RC constant of the pixel become comparable with the intrinsic switching speed of the LC mode. Therefore an upper value of sheet resistance for the third electrode 13 must be chosen so that switching speed is not slowed significantly. For practical purposes, a sheet resistance in the range ~$10^7$ Ω/square to ~$10^{11}$ Ω/square may be preferable. Aluminium was used for the first electrode 12*a* and second electrode 12*b*. The first electrode 12*a* and second electrode 12*b* may be fabricated with a transparent material or a non-transparent material. It is preferable that the resistance of the material used for the first electrode 12*a* and second electrode 12*b* is sufficiently low so that application of different voltages to the first electrode 12*a* and second electrode 12*b* (i.e. $V_{R1} \neq V_{R2}$) yields substantially the same voltage drop across the third electrode (i.e. the voltage drop between positions 16 and position 17) at all points on resultant LCD. In other words, the sheet resistance of the first electrode 12*a*, second electrode 12*b* and third electrode 13 are chosen so that substantially no voltage is dropped along the track of the first electrode 12*a* or along the track of the second electrode 12*b*. A standard Indium Tin Oxide (ITO) layer used in LCD production formed the fourth electrode 22 on the second substrate 21. Polarising films (no compensation films) were adhered to the first substrate 11 and second substrate 21.

The viewing angle response of the Normally White 1st Minimum Twisted Nematic LC switch cell described above was measured. The luminance was measured on-axis (Theta=0°) and off-axis (Theta=25°) for several different grey levels (data levels) from black to white. Off-axis (Theta=25°) measurements were performed for three different azimuth angles (Phi=0°, Phi=90° and Phi=270°).

FIG. 12 shows the viewing angle response of the Normally White 1st Minimum Twisted Nematic LC switch cell described above measured using a Normal Drive, with $V_{R1}=V_{R2}=0V$ and $V_{SIG}$ increased from 0V to $V_{SAT}$. With reference to FIG. 12, the Normalised Off-Axis Luminance response at Phi=0°, Theta=25° (circles) plotted against Normalised On-Axis Luminance shows a very linear relationship. This very linear relationship translates to an excellent viewing angle response and such an LCD would not suffer from colour shift when viewed from this off-axis direction i.e. the on-axis image and the off-axis image (Phi=0°, Theta=25°) have no noticeable difference. With reference to FIG. 12, the Normalised Off-Axis Luminance response at Phi=90°, Theta=25° (triangles) plotted against Normalised On-Axis Luminance shows a very non-linear relationship. This non-linear relationship translates to a poor viewing angle response and such an LCD would suffer from colour shift when viewed from this off-axis direction i.e. the on-axis image and the off-axis image (Phi=90°, Theta=25°) have a large noticeable difference. In particular, mid-grey data levels are excessively bright in the Phi=90°, Theta=25° (triangles) viewing direction. With reference to FIG. 12, the Normalised Off-Axis Luminance response at Phi=270°, Theta=25° (squares) plotted against Normalised On-Axis Luminance also shows a very non-linear relationship. This non-linear relationship translates to a poor viewing angle response and such an LCD would suffer from colour shift when viewed from this off-axis direction. In particular, mid-grey data levels are excessively dark in the Phi=270°, Theta=25° (squares) viewing direction.

FIG. 13 shows the viewing angle response of the Normally White 1st Minimum Twisted Nematic LC switch cell described above measured using an Analogue Multi-Pixel Drive, with $V_{R1}=+V_{TH}$, $V_{R2}=-V_{TH}$ and $V_{SIG}$ increased from 0V to $V_{R1}+V_{SAT}$. With reference to FIG. 13, the Normalised Off-Axis Luminance response at Phi=0°, Theta=25° (circles) plotted against Normalised On-Axis Luminance shows a very linear relationship. This very linear relationship translates to an excellent viewing angle response and such an LCD would not suffer from colour shift when viewed from this off-axis direction. The Phi=0°, Theta=25° (circles) viewing angle responses for the Normal Drive (FIG. 12) and the Analogue Multi-Pixel Drive (FIG. 13) are virtually identical. With reference to FIG. 13, the Normalised Off-Axis Luminance response at Phi=90°, Theta=25° (triangles) when plotted against Normalised On-Axis Luminance shows a reduced degree of non-linearity when compared with the equivalent viewing direction using the Normal Drive (FIG. 12). Therefore, the Analogue Multi-Pixel Drive (FIG. 13) has less colour shift than the Normal Drive (FIG. 13) for the Phi=90°, Theta=25° (triangles) viewing direction. With reference to FIG. 13, the Normalised Off-Axis Luminance response at Phi=270°, Theta=25° (squares) when plotted against Normalised On-Axis Luminance shows a reduced degree of non-linearity when compared with the equivalent viewing direction using the Normal Drive (FIG. 12). Therefore, the Analogue Multi-Pixel Drive (FIG. 13) has less colour shift than the Normal Drive (FIG. 13) for the Phi=270°, Theta=25° (squares) viewing direction. Clearly, the Normally White 1st Minimum Twisted Nematic LC switch cell has a better viewing angle response with Analogue Multi-Pixel Drive (FIG. 13) compared with Normal Drive (FIG. 12).

With reference to FIG. 6, a mono-domain Normally White LC mode, such as the 1$^{st}$ Minimum TN described above, has a pixel luminance that is substantially invariant across region 15 for Normal Drive. With reference to FIG. 10, using Normal Drive a given mid-grey data level (say G128) has a single mid-plane tilt value that is substantially invariant across region 15. This single mid-plane tilt value is nominally in the range ~20° to ~70° to the plane of the substrate 11, 21. In other words, for Normal Drive a mid-grey data level approximately corresponds with a uniform LC tilt angle that is intermediate between the tilt angles adopted below $V_{TH}$ and at ~$V_{SAT}$. With reference to FIG. 10, using Analogue Multi-Pixel Drive for said mid-grey data level (G128) the mid-plane tilt varies across region 15. As illustrated by FIG. 12 and FIG. 13, Analogue Multi-Pixel Drive has a better viewing angle performance than Normal Drive. In general, better viewing angle performance (i.e. less angular dependent colour shift) in LCDs is achieved by avoiding intermediate values for mid-plane tilt. In other words, Analogue Multi-Pixel Drive has a smaller spatial extent in region 15 of intermediate mid-plane tilt values than Normal Drive and therefore Analogue Multi-Pixel Drive has better viewing angle response than Normal Drive.

Figure 14:
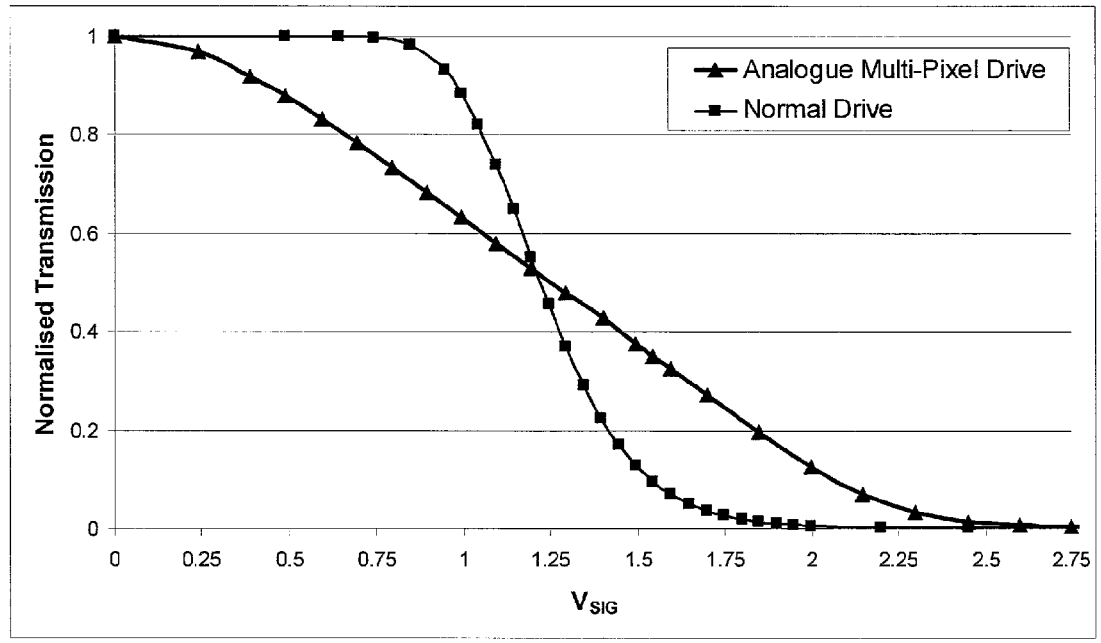
FIG. 14: Voltage-Transmission plot of a Normally White $1^{st}$ Minimum TN

FIG. 14 shows the on-axis Voltage-Transmission (V-T) curves for the Normally White 1st Minimum Twisted Nematic LC switch cell as described above. The V-T curve for Normal Drive (squares) is highly non-linear. The V-T curve for Analogue Multi-Pixel Drive is linear for most grey level (data levels). A first advantage of a predominately linear V-T curve over a highly non-linear V-T curve is that 10-bit (or higher) data levels (10-bit=1024 grey levels) are easier to achieve. A second advantage of a predominately linear V-T curve over a highly non-linear V-T curve is that any changes in $V_{SIG}$ within a frame time result in less time dependent colour shift. FIG. 14 demonstrates that for the Normally White 1st Minimum Twisted Nematic LC switch cell, $V_{SAT}$ (i.e. maximum $V_{SIG}$ value) for Analogue Multi-Pixel Drive is about 0.5V higher than $V_{SAT}$ for Normal Drive. This small increase in $V_{SAT}$ may require higher power consumption. $V_{SAT}$ for Analogue Multi-Pixel Drive may be reduced by further optimisation of parameters such as LC material, LC cell thickness, amount of negative C-plate etc.

Figure 15:
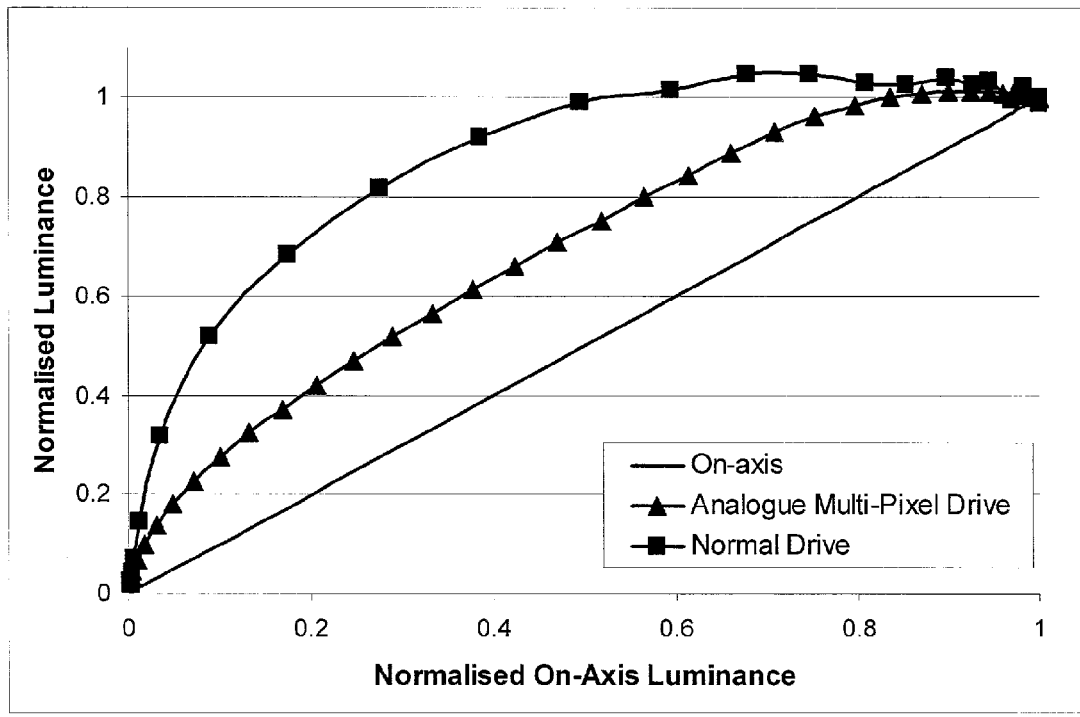
FIG. 15: Viewing angle response of a CPA VAN
Figure 16:
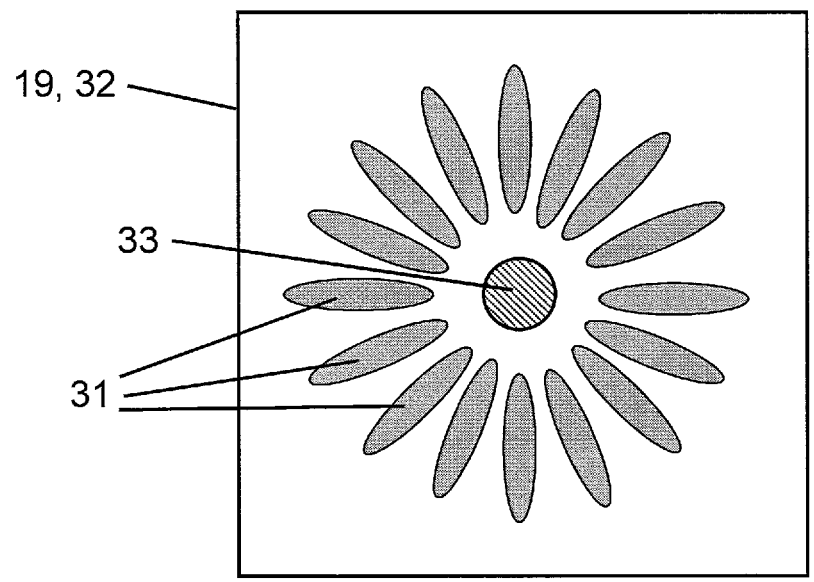
FIG. 16: Plan view of LC molecules in CPA VAN mode at saturation voltage

With reference to FIG. 15, the viewing angle performance of a Vertically Aligned Nematic (VAN) LCD for Normal Drive (squares) and Analogue Multi-Pixel Drive (triangles) is shown. FIG. 15 also shows the on-axis response plotted against itself to illustrate a desirable (perfect) linear response (i.e. perfect viewing angle performance is attained if the Normalised Luminance response at a given off-axis angle changes by the same fraction as the Normalised On-Axis Luminance response for all grey (data) levels). The VAN LCD has a rivet (protrusion) in the centre of each pixel that induces a Continuous Pin-wheel Alignment (CPA) for high signal voltages (i.e. when the LC molecules are fully switched, the majority of the molecules are aligned approximately in the plane of the substrates 11, 21 in a symmetric fashion radiating out from the rivet). A plan view of a CPA VAN pixel 32, rivet 33 and LC molecules 31 is shown show schematically in FIG. 16 at saturation voltage ($V_{SAT}$). Measurements of the on-axis and off-axis (polar angle: theta=50°) luminance response were taken for Normal Drive. The symmetry of the LC switch means that to a first approximation, the viewing angle performance is invariant of the azimuthal viewing angle direction. For Normal Drive (squares), the Normalised Off-Axis Luminance response plotted against Normalised On-Axis Luminance shows a very non-linear relationship. For Normal Drive (squares) it is clear that when the on-axis luminance has dropped to half luminance, the off-axis luminance has hardly dropped at all. In other words, for mid and high data levels, the CPA VAN transmits too much light off-axis. The Analogue Multi-Pixel Drive (triangles) response is calculated from the Normal Drive (squares) data. The calculation assumes that $V_{R1}=+V_{TH}$, $V_{R2}=-V_{TH}$ and $V_{SIG}$ increases from 0V to $V_{R1}+V_{SAT}$. For Analogue Multi-Pixel Drive (triangles), the Normalised Off-Axis Luminance response plotted against Normalised On-Axis Luminance shows a relationship that is considerably less non-linear than that of Normal Drive (squares). The Analogue Multi-Pixel Drive (triangles) response is a much closer approximation to the linear (perfect) on-axis response than the Normal Drive (squares). Clearly, the Analogue Multi-Pixel Drive (triangles) has better viewing angle response than Normal Drive (squares) in the case of a CPA VAN LCD.

Figure 17:
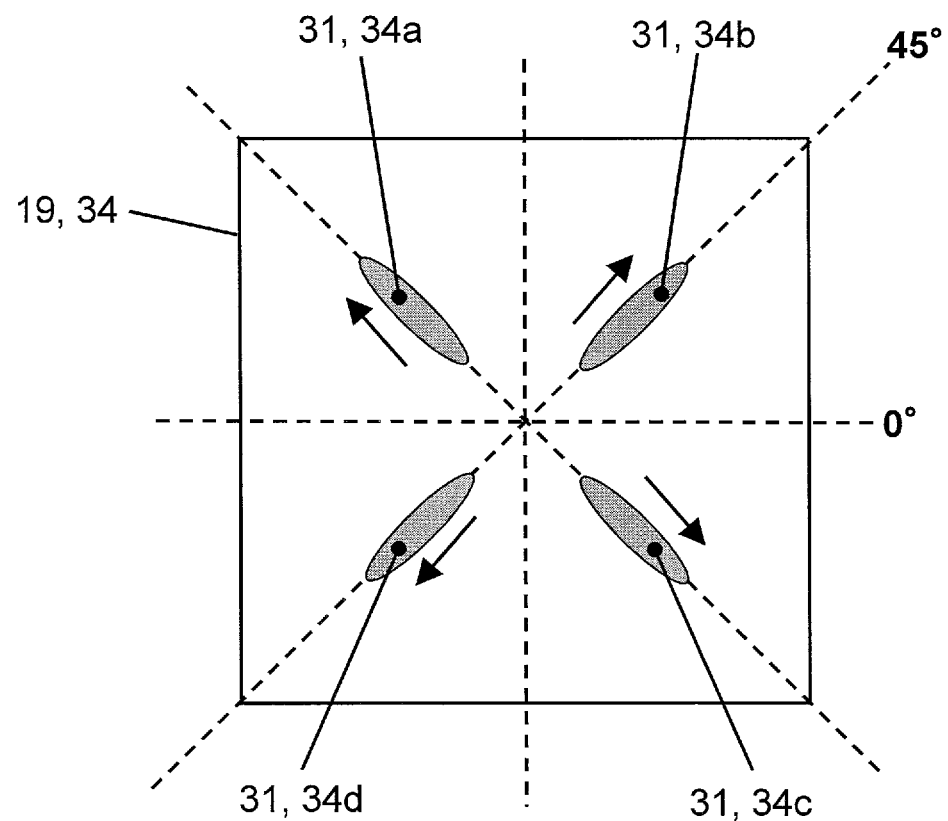
FIG. 17: Plan view of LC molecules in 4-domain VAN mode at saturation voltage

A schematic plan view of a multi-domain VAN pixel, in this example a 4-domain VAN pixel, at saturation voltage ($V_{SAT}$) is shown in FIG. 17. Alignment technologies, such as patterned UV alignment, are used to align the LC molecules in 4 substantially orthogonal directions (i.e. 4 domains). The azimuthal viewing directions 0° and 45° are shown. With reference to FIG. 18 and FIG. 19, the viewing angle performance of a 4-domain VAN pixel for Normal Drive (squares) and Analogue Multi-Pixel Drive (triangles) is shown. FIG. 18 and FIG. 19 also shows the on-axis response plotted against itself to illustrate a desirable (perfect) linear response (i.e. perfect viewing angle performance is attained if the Normalised Luminance response for a given off-axis angle changes by the same fraction as the Normalised On-Axis Luminance response for all grey (data) levels). The Normal Drive (squares) luminance response data was obtained from LC simulation. The Analogue Multi-Pixel Drive (triangles) luminance response was then calculated from the Normal Drive (squares) data. The calculation assumes that $V_{R1}=+V_{TH}$, $V_{R2}=-V_{TH}$ and $V_{SIG}$ increases from 0V to $V_{R1}+V_{SAT}$. The off-axis polar viewing angle for FIG. 18 and FIG. 19 is 50° (i.e. Theta=50°) while FIG. 18 shows the off-axis azimuth viewing angle of Phi=0° and FIG. 19 shows the off-axis azimuth viewing angle of Phi=45°. With reference to FIG. 18, the Normalised Off-Axis Luminance response plotted against Normalised On-Axis Luminance for Normal Drive (squares) shows a non-linear relationship. With reference to FIG. 18, the Normalised Off-Axis Luminance response plotted against Normalised On-Axis Luminance for Analogue Multi-Pixel Drive (triangles) shows relationship that is much less non-linear than the Normal Drive (squares). Clearly, the Analogue Multi-Pixel Drive (triangles) has better viewing angle response than Normal Drive (squares) for the Phi=0°, Theta=50° viewing direction. With reference to FIG. 19, the Normalised Off-Axis Luminance response plotted against Normalised On-Axis Luminance for Normal Drive (squares) shows a very non-linear relationship. With reference to FIG. 19, the Normalised Off-Axis Luminance response plotted against Normalised On-Axis Luminance for Analogue Multi-Pixel Drive (triangles) shows relationship that is much less non-linear than the Normal Drive (squares). Clearly, the Analogue Multi-Pixel Drive (triangles) has better viewing angle response than Normal Drive (squares) for the Phi=45°, Theta=50° viewing direction. Given the symmetric nature of the 4-domain VAN, it is clear from FIG. 18 and FIG. 19 the Analogue Multi-Pixel Drive (triangles) has better viewing angle response than Normal Drive (squares) in a 4-domain VAN, and it is expected that that this will generally apply for multi-domain VAN pixels regardless of the number of domains per pixel.

Figure 20:
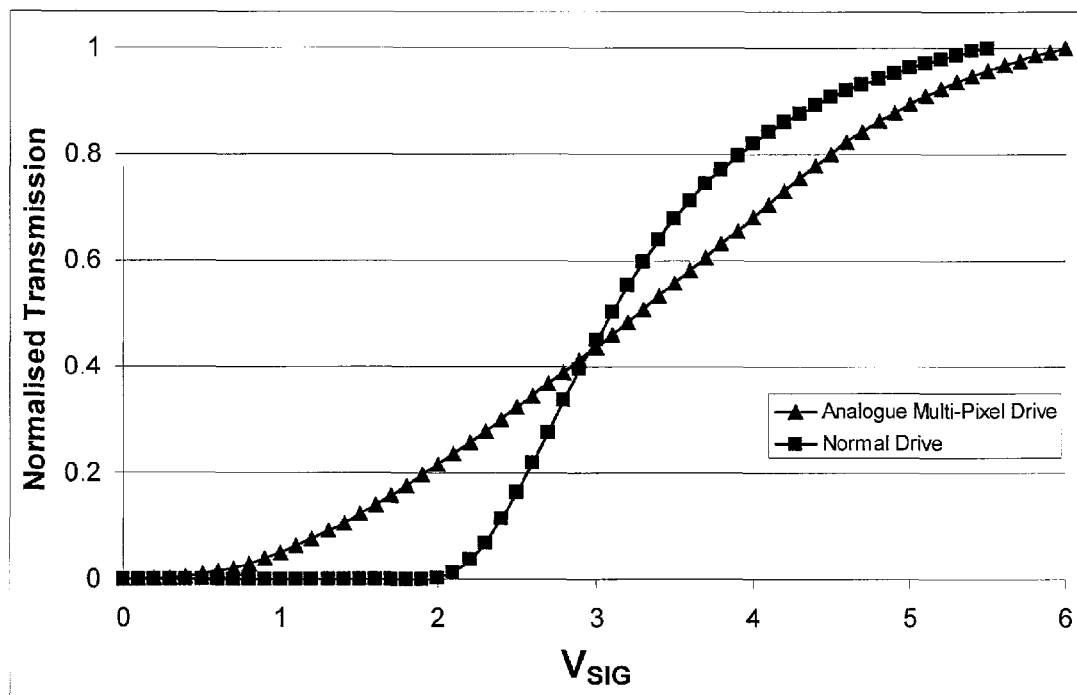
FIG. 20: Voltage-Transmission plot of a 4-domain Normally Black VAN

FIG. 20 shows the on-axis Voltage-Transmission (V-T) curves for the 4-domain VAN as described above. The V-T curve for Normal Drive (squares) is highly non-linear. The V-T curve for Analogue Multi-Pixel Drive is linear for most grey level (data levels). A first advantage of a predominately linear V-T curve over a highly non-linear V-T curve is that 10-bit (or higher) data levels (10-bit=1024 grey levels) are easier to achieve. A second advantage of a predominately linear V-T curve over a highly non-linear V-T curve is that any changes in $V_{SIG}$ within a frame time result in less time dependent colour shift. FIG. 20 demonstrates that for the 4-domain VAN, $V_{SAT}$ (i.e. maximum $V_{SIG}$ value) for Analogue Multi-Pixel Drive is about 0.5V higher than $V_{SAT}$ for Normal Drive. This small increase in $V_{SAT}$ may require higher power consumption. $V_{SAT}$ for Analogue Multi-Pixel Drive may be reduced by further optimisation of parameters such as LC material, LC cell thickness, amount of negative C-plate etc.

With reference to FIG. 21, FIG. 22, FIG. 23 and FIG. 24, the first electrode 12a and second electrode 12b may be situated on the colour filter substrate, with red pixels denoted by "R", green pixels denoted by "G" and blue pixels denoted by "B". In general, the first electrode 12a and second electrode 12b are situated on the substrate opposite the substrate to which $V_{SIG}$ is applied. $V_{SIG}$ may be applied to a coloured sub-pixel 19 via a conventional Thin Film Transistor (TFT). Region 18c (see FIG. 10, FIG. 11) may adjoin the first electrode 12a for a given mid-grey data level or region 18c may adjoin the second electrode 12b for a given mid-grey data level.

Figure 21:
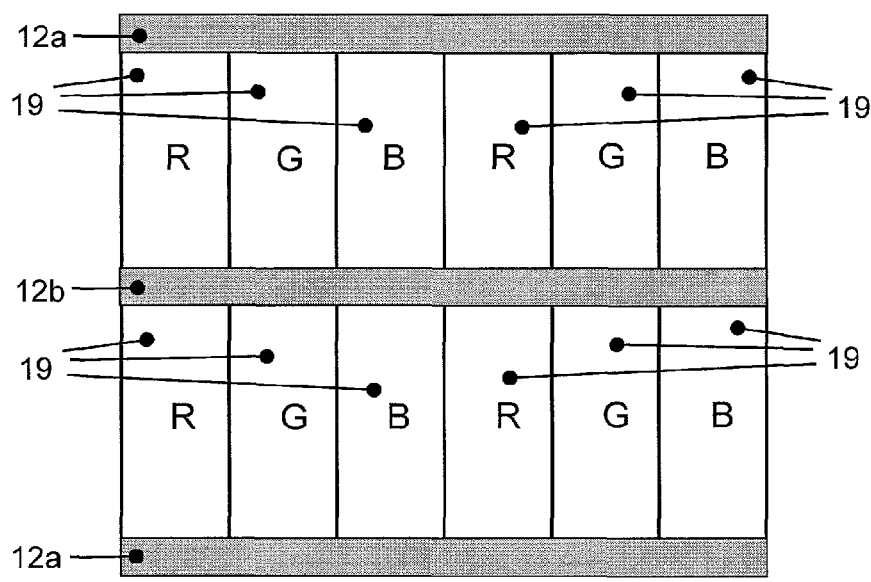
FIG. 21: Configuration of sub-pixels and electrodes for applying a voltage gradient
Figure 22:
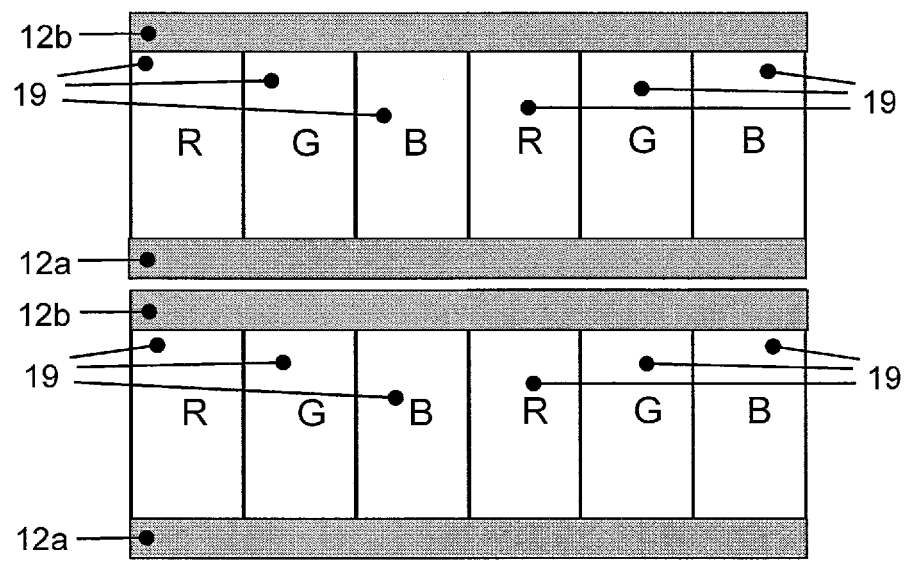
FIG. 22: Configuration of sub-pixels and electrodes for applying a voltage gradient
Figure 23:
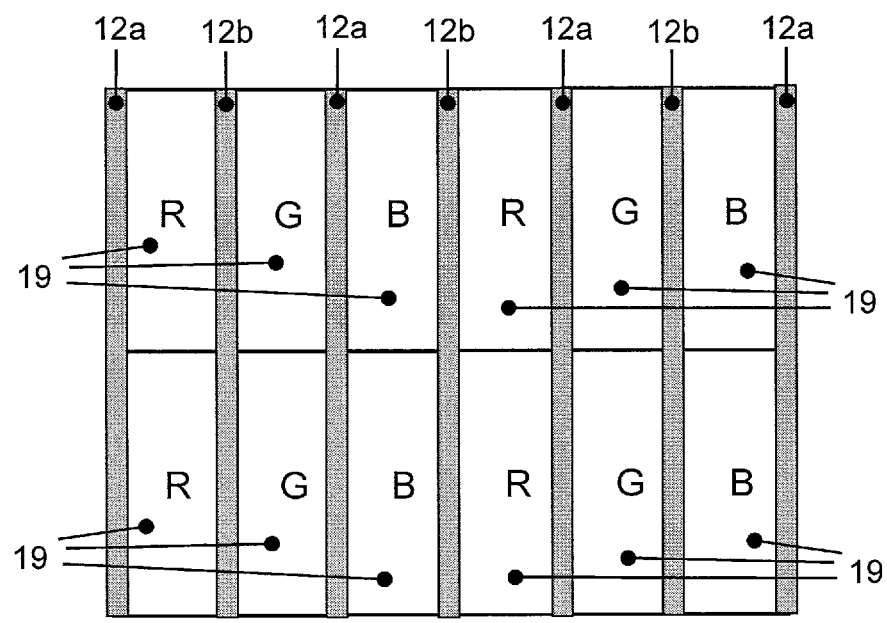
FIG. 23: Configuration of sub-pixels and electrodes for applying a voltage gradient

FIG. 21 and FIG. 22 illustrate how the first electrode 12a and the second electrode 12b may be situated in rows between the colour sub-pixels 19. The electrode design of FIG. 21 may be able to render a brighter image than the electrode design of FIG. 22 since FIG. 21 uses fewer electrodes 12a and 12b per sub pixel 19 and thus may have a higher aperture ratio. FIG. 23 illustrates how the first electrode 12a and the second electrode 12b may be situated in columns between the colour pixels.

Figure 24:
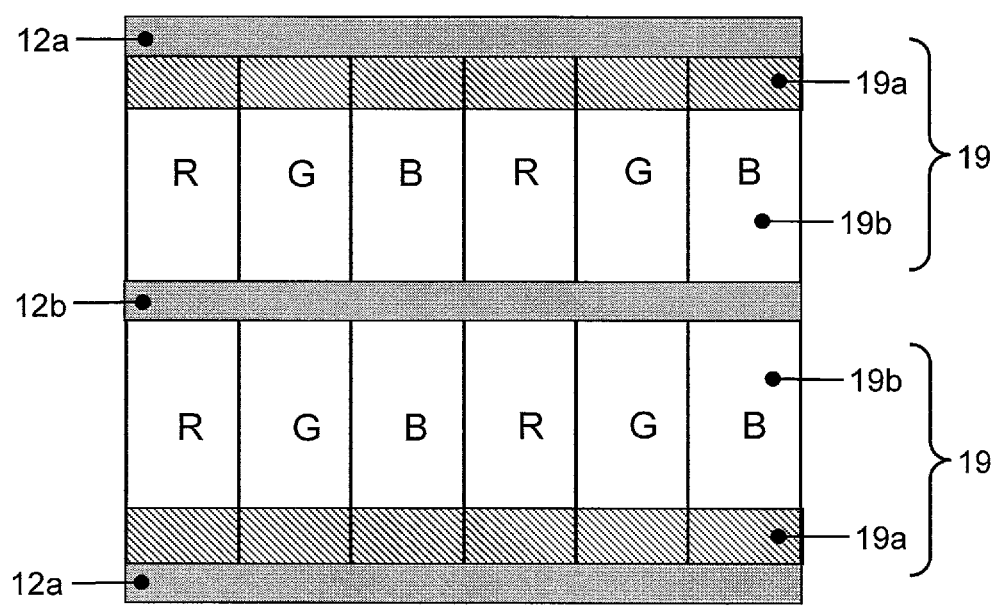
FIG. 24: Configuration of sub-pixels and electrodes for applying a voltage gradient

With reference to FIG. 24, each pixel may comprise a reflective region 19a and a transmissive region 19b. For low ambient lighting conditions (for example, indoors), it may be preferential that Region 18c (see FIG. 10, FIG. 11) adjoins the first electrode 12a for any given mid-grey data level (for example, G128). This may be achieved for a Normally White mode or a Normally Black via suitable application of voltages to the first, second and fourth electrodes. For example, assume electrode 12a has a voltage of ~+$V_{TH}$ and electrode 12b has a voltage of ~-$V_{TH}$. For a Normally White LC mode, Region 18c will adjoin the first electrode 12a by using a negative signal voltage (-$V_{SIG}$) on electrode 4 (not shown). For a Normally Black LC mode, Region 18c will adjoin the first electrode 12a by using a positive signal voltage (+$V_{SIG}$) on electrode 4 (not shown). Alternatively, if we assume electrode 12a has a voltage of ~-$V_{TH}$ and electrode 12b has a voltage of ~+$V_{TH}$. For a Normally White LC mode, Region 18c will adjoin the first electrode 12a by using a positive signal voltage (+$V_{SIG}$) on electrode 4 (not shown). For a Normally Black LC mode, Region 18c will adjoin the first electrode 12a by using a positive signal voltage (-$V_{SIG}$) on electrode 4 (not shown).

For high ambient lighting conditions (for example, outdoors), it may be preferential that Region 18c (see FIG. 10, FIG. 11) adjoins the second electrode 12b for any given mid-grey data level. (for example, G128). This may be achieved for a Normally White mode or a Normally Black via suitable application of voltages to the first, second and fourth electrodes. For example, assume electrode 12a has a voltage of ~+$V_{TH}$ and electrode 12b has a voltage of ~-$V_{TH}$. For a Normally White LC mode, Region 18c will adjoin the second electrode 12b by using a positive signal voltage (+$V_{SIG}$) on electrode 4 (not shown). For a Normally Black LC mode, Region 18c will adjoin the second electrode 12b by using a negative signal voltage (-$V_{SIG}$) on electrode 4 (not shown). Alternatively, if we assume electrode 12a has a voltage of ~-$V_{TH}$ and electrode 12b has a voltage of ~+$V_{TH}$. For a Normally White LC mode, Region 18c will adjoin the second electrode 12a by using a negative signal voltage (-$V_{SIG}$) on electrode 4 (not shown). For a Normally Black LC mode, Region 18c will adjoin the second electrode 12a by using a positive signal voltage (+$V_{SIG}$) on electrode 4 (not shown).

Figure 25A:
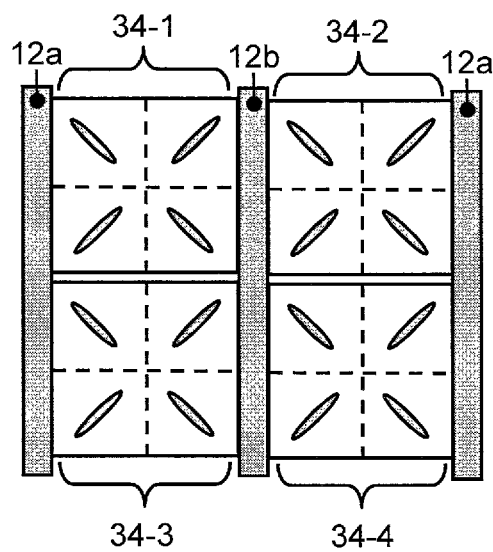
FIG. 25a: 4-domain VAN pixels and electrodes for applying a voltage gradient
Figure 25B:
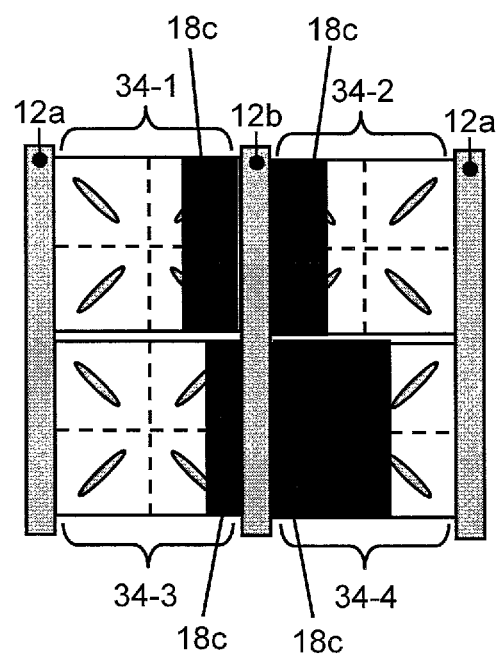
FIG. 25b: 4-domain VAN pixels and electrodes for applying a voltage gradient
Figure 26:
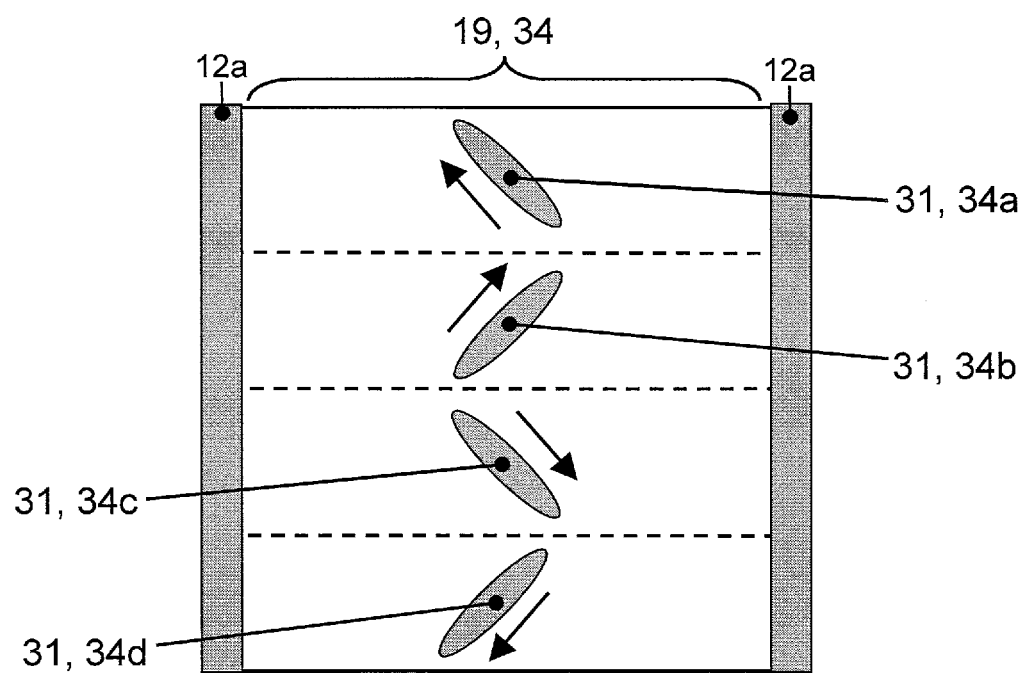
FIG. 26: Plan view of LC molecules in 4-domain VAN mode at saturation voltage

FIG. 25a and FIG. 25b illustrate a region of a display comprised of 4 sub-pixels labelled 34-1, 34-2, 34-3 and 34-4. Each sub-pixel has a 4-domain VAN 34 alignment structure, as illustrated by the LC domain patterning in FIG. 17. FIG. 25a illustrates each sub-pixel at maximum luminance (highest possible data level). FIG. 25b illustrates sub-pixel 34-1 and 34-2 at the same luminance (say G200) and sub-pixel 34-3 at a higher luminance than 34-1 (say G225) and sub-pixel 34-4 at a lower luminance than 34-1 (say G85). FIG. 25b clearly illustrates that for mid-grey levels, the black region 18c of each sub-pixel does not evenly cover each of the 4 LC domains in said sub-pixel (regions 18a and 18b have been omitted for illustrative clarity). Assuming a normally black LC mode and with reference to FIG. 17, LC domains 31a and 31d are switched before LC domains 31b and 31c are switched (i.e. the LC domains 31a and 31d that adjoin electrode 12a are switched before the LC domains 31b and 31c that adjoin electrode 12b). Optimum viewing angle performance may be achieved if all LC domains of a given sub-pixel are switched by approximately the same proportion. With reference to FIG. 26, by changing the spatial distribution of the 4 LC domains in the pixel 19, 34 relative to the electrodes 12a and 12b then all LC domains of a given sub-pixel 19 may be switched simultaneously over approximately the same spatial proportion for a given data level (grey level). Therefore the LC domain patterning relative to the electrodes 12a and 12b as illustrated in FIG. 26 may enable improved viewing angle performance over the LC domain patterning illustrated FIG. 25a, FIG. 25b and FIG. 17 when an Analogue Multi-Pixel Drive scheme is employed. In general, simultaneous switching the same proportion of all LC domains in a sub-pixel 19 for a given data level using an Analogue Multi-Pixel Drive scheme may benefit viewing angle performance. It is worth nothing that with reference to FIG. 25b, switching sub-pixels 34-1 and 34-2 with LC alignment as depicted in FIG. 17 to the same data level is substantially optically equivalent to switching said sub-pixels with LC alignment as depicted in FIG. 26 since the same proportion of all LC domains are switched in both LC alignment cases.

An important aspect of LCD driving is that the time averaged pixel drive voltages are DC balanced in ordered to prevent image artefacts such as ghosting. In essence, DC balancing (also known as "inversion driving") involves driving a pixel with a positive voltage for a first time frame and with a negative voltage for a subsequent time frame such that when averaged over time, no net accumulation of charge occurs on either substrate of the LCD. FIG. 27 and FIG. 28 illustrate a DC balanced driving scheme for the Analogue Multi-Pixel Drive. With reference to FIG. 27, a Normally White single pixel 19 (which may be a sub-pixel) is shown at some intermediate data level (for example, G128). Note that an intermediate data level and a Normally White LC mode pixel are arbitrary choices and that the DC balancing scheme described here is relevant to all data levels and Normally Black LC modes. Frame 1 of FIG. 27 shows electrode 12a with voltage $V_{R1}$ and electrode 12b with voltage $V_{R2}$. For this example, $V_{R1}=+V$ and $V_{R2}=-V$ so that $V_{R1}=-V_{R2}$. A signal voltage $-V_{SIG}$ is applied to the fourth electrode 22 (not shown). In general, Frame 1 is not DC balanced. Frame 2 of FIG. 27 shows electrode 12a with voltage $V_{R2}=-V$ and electrode 12b with voltage $V_{R1}=+V$ and $+V_{SIG}$ applied to the fourth electrode 22 (not shown). In general, Frame 2 is not DC balanced. However the average of Frame 1+Frame 2 is DC balanced in that the time averaged voltages across the pixel (across the LC layer) have no net DC component. This inversion scheme does not require any LC switching to occur in the transition from Frame 1 to Frame 2. FIG. 27 illustrates DC balancing in a single pixel or sub-pixel (whatever is the smallest addressable area of an LCD).

FIG. 28 shows an implementation of the inversion scheme of FIG. 27 to 3 white pixels of an LCD with Analogue Multi-Pixel Drive. Each white pixel in FIG. 28 is comprised of 3 colour sub-pixels denoted by R, G and B, however, this discussion is not limited to LCDs with 3 colour sub-pixels per white pixel. FIG. 28 shows a single column of white pixels labelled C1 and 3 rows of white pixel labelled R1, R2 and R3 respectively.

Each sub-pixel has an associated Thin Film Transistor (TFT, not shown in FIG. 28 but shown in FIG. 30) to enable addressing of the signal voltage $V_{sig}$ to the fourth electrode (not shown) of each sub-pixel. One example of a controller suitable for driving a display of the invention will now be described with reference to FIGS. 30, 31 and 32. In this example, the controller comprises a first arrangement of control electronics for driving the first and second electrodes 12a,12b of a pixel and a second arrangement of control electronics for driving the fourth electrode of a pixel.

Figure 31:
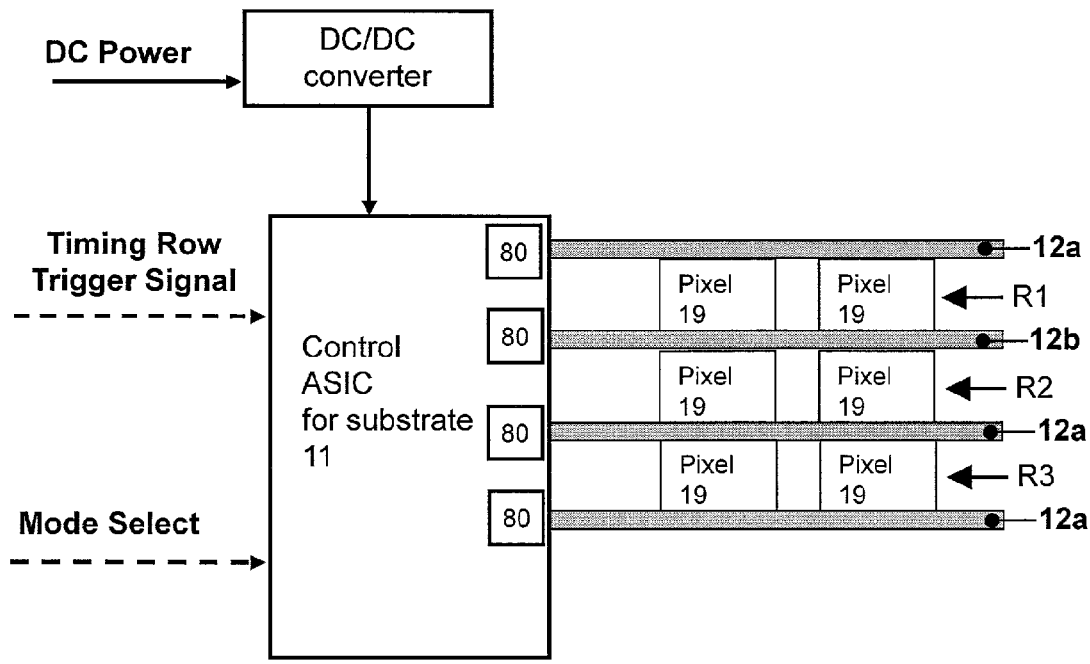
FIG. 31: Liquid Crystal Display with associated drive electronics

A standard arrangement of sub-pixels 19, TFTs and associated control electronics is shown in FIG. 30 that may be used to apply $V_{SIG}$ to the fourth electrode of each sub-pixel. An arrangement of control electronics that may be used to apply a first voltage, $V_{R1}$, to the first electrode 12a and a second voltage, $V_{R2}$, to the second electrode 12b is shown in FIG. 31. As will be understood from the above description, for example from FIGS. 27 and 28a-d, only certain values of $V_{R1}$ and $V_{R2}$ are used so, in one embodiment, the control electronics may be arranged to supply $V_{R1}$ and $V_{R2}$ such that $V_{R1}$ may take the value $V_{COM}$, +V or -V and $V_{R2}$ may take the value $V_{COM}$, +V or -V.

In the example of FIGS. 30 and 31 each arrangement of control electronics includes a respective Control ASIC. The Control ASIC for substrate 21 (FIG. 30) and the Control ASIC for substrate 11 (FIG. 31) must be coupled in some way so that the voltages of the first 12a, second 12b and fourth 21 electrodes pertaining to the pixels in the same row (R1, R2, R3 etc.) are changed in a synchronous fashion in the Analogue Multi-Pixel Drive. In general, a row timing trigger signal (clock) is used to synchronise the Control ASIC for substrate 11 and the Control ASIC for substrate 21. For example, the Control ASIC for substrate 21 may send a timing row trigger signal to the Control ASIC for substrate 11 to ensure that the voltages of the first 12a, second 12b and fourth 21 electrodes pertaining to any given row of sub-pixels (R1, R2, R3 etc.) are changed in a synchronous fashion. A detailed example of the synchronisation is described with reference to FIG. 28.

The Control ASIC for substrate 21 (FIG. 30) has a Mode Select input and a Data Signal (Data Level). The Mode Select (which may be activated by the user or a predefined automated process) is used select either Normal Drive or Analogue Multi-Pixel Drive. In Normal Drive a first look-up table is used to convert the input Data Signal to the desired output voltage for the fourth 21 electrode of each pixel 19. In Analogue Multi-Pixel Drive a second look-up table, that may be different from the first look-up table, is used to convert the input Data Signal to the desired voltage for the fourth 21 electrode of each pixel 19.

The Control ASIC for substrate 11 (FIG. 31) has a Mode Select input and a Timing Row Trigger Signal (clock) input. The Mode Select (which may be activated by the user or a predefined automated process) is used to select either Normal Drive or Analogue Multi-Pixel Drive. In Normal Drive, $V_{R1}=V_{R2}$ and each row electrode (12a, 12b etc.) for all rows (R1, R2, R3 etc.) are globally switched to the same voltage, for example $V_{COM}$. (The term "$V_{COM}$" is used to denote a voltage that, in the Normal Drive mode, is applied to each row electrode. $V_{COM}$ may be zero, although the invention does not require this.) In Analogue Multi-Pixel Drive, each row electrode (12a, 12b) for each row (R1, R2, R3 etc.) is switched to either +V or -V. When the Control ASIC for substrate 21 addresses the pixels 19 of Row 1 (R1) then a Timing Row Trigger Signal is passed to the Control ASIC for substrate 11 so that the row electrodes (12a, 12b) pertaining to the pixels 19 of Row 1 (R1) are switched to the appropriate voltage (+V or -V) in synchronisation with the addressing of R1 on substrate 21. In essence, all pixels 19 in a given row (R1, R2, R3 etc.) are addressed with the appropriate voltages in a synchronous fashion.

Figure 32:
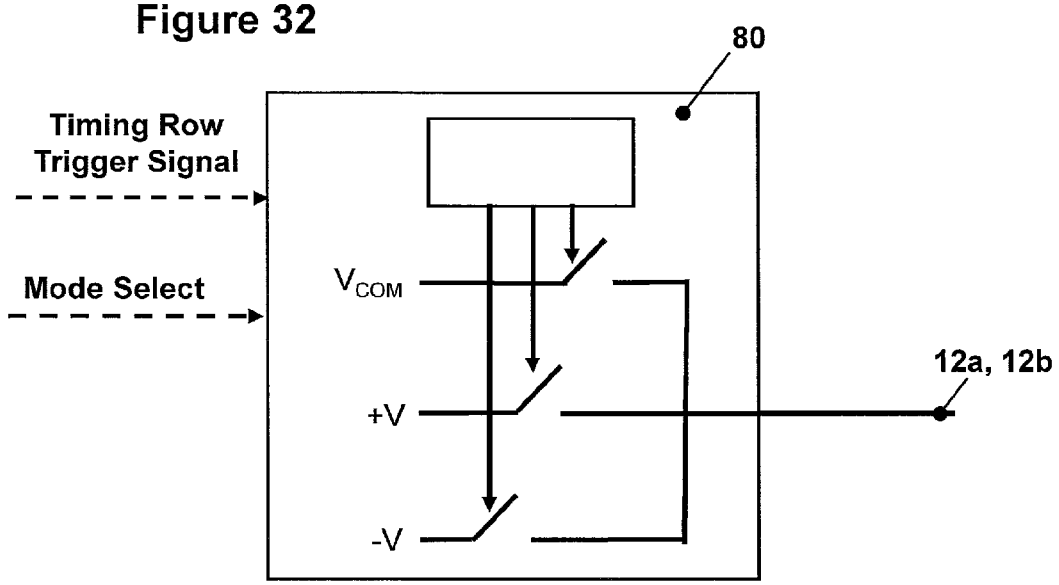
FIG. 32: The output circuit 80 of a Control ASIC of FIG. 31

In this example the output circuit 80 of the Control ASIC for substrate 11 has 3 outputs ($V_{COM}$, +V or -V) as shown in FIG. 32. The Timing Row Trigger Signal for Control ASIC for substrate 11 (FIG. 31) may come from the Control ASIC for the substrate 21 (FIG. 30).

If the Control ASIC for substrate 21 (FIG. 30) is set to Normal Drive by the Mode Select then the Control ASIC for substrate 11 (FIG. 31) is also set to Normal Drive by the Mode Select. If the Control ASIC for substrate 21 (FIG. 30) is set to Analogue Multi-Pixel Drive by the Mode Select then the Control ASIC for substrate 11 (FIG. 31) is also set to Analogue Multi-Pixel Drive by the Mode Select.

Figure 28A:
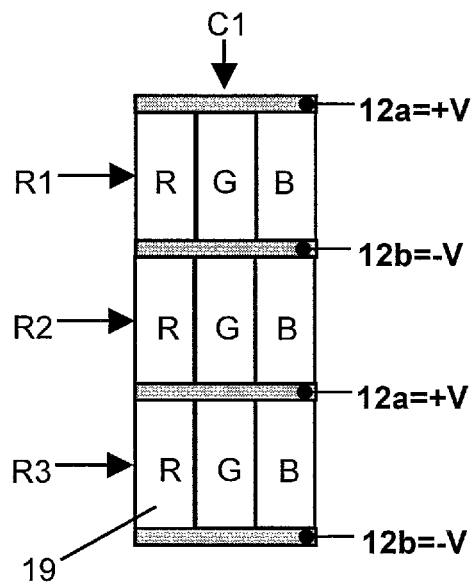
FIG. 28a: DC balancing in an LCD with Analogue Multi-Pixel Drive
Figure 28B:
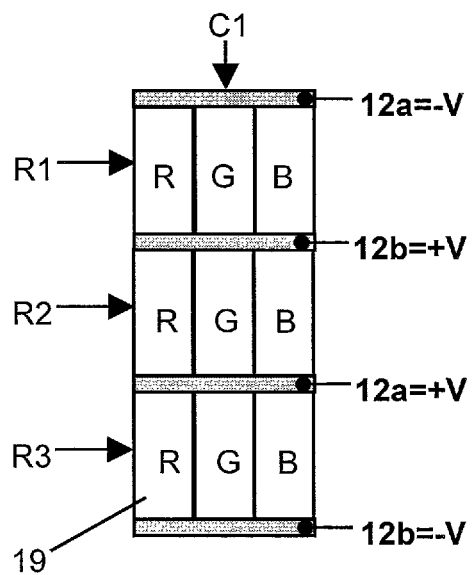
FIG. 28b: DC balancing in an LCD with Analogue Multi-Pixel Drive
Figure 28C:
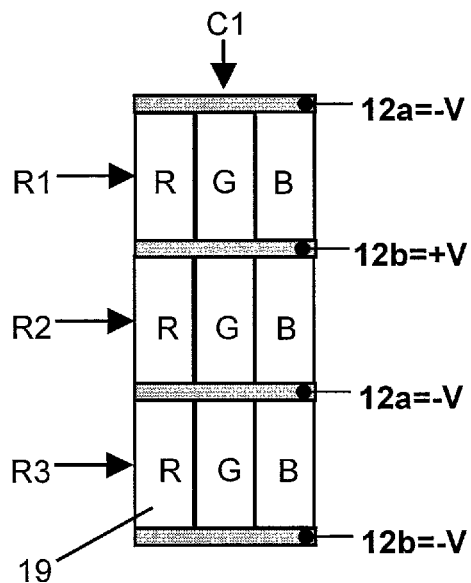
FIG. 28c: DC balancing in an LCD with Analogue Multi-Pixel Drive
Figure 28D:
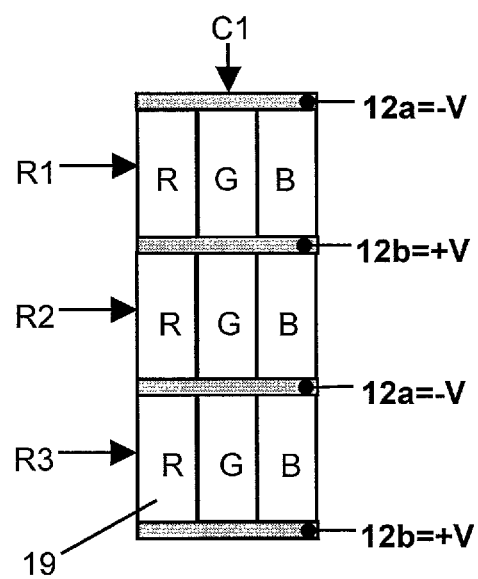
FIG. 28d: DC balancing in an LCD with Analogue Multi-Pixel Drive

FIG. 28a depicts the voltages applied to all sub-pixels at the end of Frame 1, with electrode 12a=+V, electrode 12b=-V. For simplicity of illustrative purposes, let us assume that the same signal voltage, $-V_{SIG}$, has been applied to the fourth electrode 22 (not shown) of all sub-pixels in FIG. 28a (i.e. all sub-pixels 19 are addressed with the same data level). To achieve no net DC component, the pixels should be driven in Frame 2 as shown in FIG. 28d—that is, with the voltage on each row electrode reversed in sign and with the signal voltage also reversed in sign so that electrode 12a=-V, electrode $12b=+V$ and the signal voltage$=+V_{sig}$. However, limitations in control electronics mean that it is not normally possible to switch direct from the state shown in FIG. 28a to the state shown in FIG. 28d. FIGS. 28b and 28c show an example of intermediate voltage application states that allow a transition from the state shown in FIG. 28a to the state shown in FIG. 28d in a manner that is compatible with conventional control electronics.

FIG. 28b represents the start of Frame 2 and the addressing of all sub-pixels in R1. At the start of Frame 2, the voltage on electrode 12a pertaining to all the R1 sub-pixels is changed from +V to −V. The voltage on electrode 12b pertaining to all the R1 sub-pixels and shared with the R2 sub-pixels is changed from −V to +V. The array of TFTs (not shown) is employed in a standard fashion so the voltages on the fourth electrodes 22 are changed from $-V_{SIG}$ to $+V_{SIG}$ so that all the sub-pixels in R1 are addressed with the new signal voltage $+V_{SIG}$. The array of TFTs (not shown) are then addressed so that all sub-pixels in R1 are electrically isolated from the signal voltages that are subsequently applied to the R2, R3 etc. FIG. 28c illustrates the addressing process for sub-pixels in R2. The electrode 12a pertaining to all the R2 sub-pixels and shared with the R3 sub-pixels is changed from +V to −V. The array of TFTs (not shown) are employed in a standard fashion so the voltages on the fourth electrodes 22 are changed from $-V_{SIG}$ to $+V_{SIG}$ so that all the sub-pixels in R2 are addressed with the new signal voltage $-V_{SIG}$. The array of TFTs (not shown) are then addressed so that all sub-pixels in R2 are electrically isolated from (and the sub-pixels in R1 remain electrically isolated from) the signal voltages that are subsequently applied to the R3 row of pixels. FIG. 28d illustrates the addressing process for sub-pixels in R3. The electrode 12b pertaining to all the R3 sub-pixels and shared with the R4 sub-pixels (not shown) is changed from −V to +V. The array of TFTs (not shown) are employed in a standard fashion so the voltages on the fourth electrodes 22 are changed from $+V_{SIG}$ to $-V_{SIG}$ so that all the sub-pixels in R3 are addressed with the new signal voltage $+V_{SIG}$. This process of inverting the voltage on the first electrode 12a and inverting the voltage on the second electrode 12b for a given row and then inverting the signal voltage for each sub-pixel on said row is then repeated for each row of the LCD (the "write" time). The voltages of FIG. 28d are then maintained for the remaining duration of Frame 2 (the "blank" time). By comparing FIG. 28a and FIG. 28d, it is clear that the addressed data will yield the same image in Frame 2 as in Frame 1, and that the average voltage across the LC of all sub-pixels is DC balanced across the overall duration of Frame 1 and Frame 2.

It is worth noting for this particular configuration of sub-pixels and electrodes 12a and 12b that for a period of time while a given row is being addressed, say Rn, the subsequent row, Rn+1, will have an incorrect voltage gradient applied across the pixel. With reference to FIG. 28b, while R1 is being addressed, electrode 12b pertaining to R2 and electrode 12a pertaining to R2 both have the same voltage (+V) applied. Consequently, while R1 is being addressed, the voltage gradient across R2 sub-pixels is 0, which is incorrect for the desired data level. However, provided that the time for which the voltage gradient across the R2 (or, generally Rn+1) sub-pixels is incorrect is significantly less than the response time of the LC molecules and consequently, no LC switching in R2 (or Rn+1) sub-pixels occurs while the R1 (or Rn) sub-pixels are being addressed. This will be further clarified by the following example.

In a frame there is a "write" time when data are written to the pixels and a "blank" time before the write time of the subsequent frame. The overall duration of the frame is the sum of the write time and the blank time−write time+blank time=overall frame time. Depending upon the application, the write time can be as small as 5% of the overall frame time or as large as 50% (and probably more) of the overall frame time. What is important for the voltage switching steps of FIGS. 28b and 28c is that the time duration to write data to a single row is insignificant compared to the switching time of the LC. This is because when data is being written to a given row (row Rn), then the subsequent row (row Rn+1) will have an incorrect voltage gradient applied across all its pixels—but only for the duration of writing data to row Rn. This incorrect voltage gradient will change the data level of pixels in row Rn+1, but only if the incorrect voltage gradient persists for a time approaching the switching time of the LC material. Consider an example in which a display updates at 120 Hz—this gives a frame time of approximately 8 ms. If the write time is 50% of the frame time (a slowish write time), information is written to the whole display in approximately 4 ms. If the display has 500 rows (not a particularly high number today), then the time taken to write each row is approximately 4/500 ms—i.e., approximately 0.008 ms. 0.008 ms is about 2 orders of magnitude shorter than the response time the LC used in almost all (99.99%) of liquid crystal displays today. Thus, even though the voltage switching steps of FIGS. 28b and 28c lead to the wrong voltage being applied to rows of pixels in writing every frame, the duration of the time for which an incorrect voltage is applied to a row of pixels is much less than the response time of the liquid crystal material, and so the application of the incorrect voltage does not cause the liquid crystal material to switch.

Figure 29A:
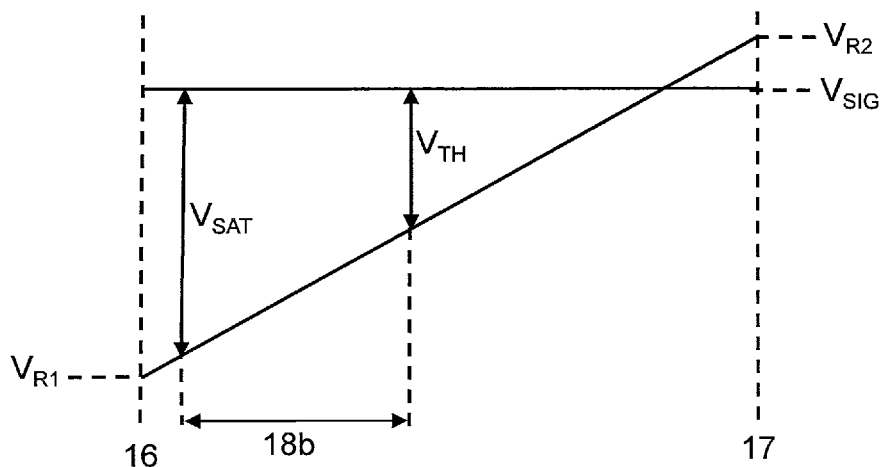
FIG. 29a: Voltage diagram of Analogue Multi-Pixel Drive
Figure 29B:
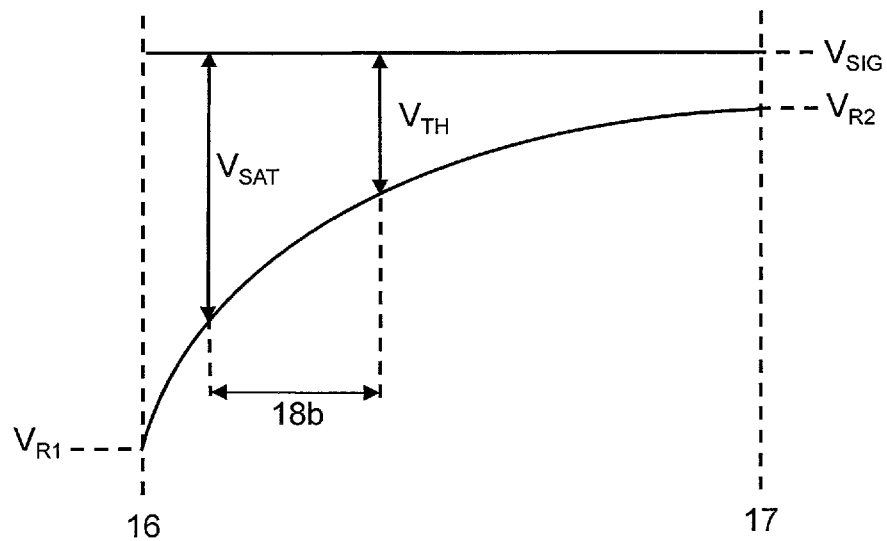
FIG. 29b: Voltage diagram of Analogue Multi-Pixel Drive

FIG. 29a illustrates a voltage diagram for an Analogue Multi-Pixel Drive pixel when the third electrode 13 has uniform resistance between electrode 12a and electrode 12b. A uniform resistance between electrode 12a and electrode 12b yields a uniform voltage gradient between position 16 at voltage $V_{R1}$ and position 17 at $V_{R2}$ (i.e. the voltage gradient is the same for all points between position 16 and position 17. FIG. 29b illustrates a voltage diagram for an Analogue Multi-Pixel Drive pixel when the third electrode 13 has non-uniform resistance between electrode 12a and electrode 12b. In order to yield the functional form of the voltage diagram shown in FIG. 29b, the resistance of the third electrode 13 has a first value at position 16 and a second value at position 17 and the resistance changes along the length 15 of the pixel from the first value to the second value. A non-uniform resistance between electrode 12a and electrode 12b yields a non-uniform voltage gradient between position 16 (at voltage $V_{R1}$) and position 17 (at voltage $V_{R2}$). The third electrode may have a non-uniform resistance if the thickness of the third electrode is patterned between positioned 16 and 17. The third electrode may have a non-uniform resistance if a patterned doping process is applied between positioned 16 and 17. The third electrode may have a non-uniform resistance if the width of the electrode is changed between positions 16 and 17. The third electrode may have a non-uniform resistance between positions 16 and 17 by combining two or more of the methods previously described for obtaining a non-uniform resistance. With reference to FIG. 29a and FIG. 29b, the spatial region 18b within the pixel whereby $V_{TH}<|V_{SIG}|<V_{SAT}$ has a graded luminance. As discussed previously, minimising the spatial extent of region 18b may improve the viewing angle performance. It is clear by comparison of FIG. 29a and FIG. 29b that the spatial extent of region 18b is smaller in FIG. 29b than in FIG. 29b. Therefore a third electrode 13 of non-uniform resistance may improve the viewing angle performance for at least a first range of data values (grey levels) since the region 18b may be compressed for the first range of data values.

An LCD with a pixel electrode structure, such as that shown in FIG. 5, can driven with Normal Drive (as shown in FIG. 6 and FIG. 8) and Analogue Multi-Pixel Drive (as shown in FIG. 7 and FIG. 9). Light modulation in an LCD with said pixel electrode structure may be performed using Normal Drive across the entire area of said display. Light modulation in an LCD with said electrode structure may be performed across the entire area of said display using Analogue Multi-Pixel Drive. An LCD may have at least a first spatial region where light modulation is achieved via Normal Drive and at least a second spatial region where light modulation is achieved via Analogue Multi-Pixel Drive.

An LCD with a pixel electrode structure, such as that shown in FIG. 5, can driven in a Normal Drive (as shown in FIG. 6 and FIG. 8) and an Analogue Multi-Pixel Drive (as shown in FIG. 7 and FIG. 9). Switching between the Normal Drive and the Analogue Multi-Pixel Drive may be used to modify the viewing angle performance of the LCD. Image processing algorithms (such as those disclosed in GB2428152 and US2010214324) may be used to further modify the viewing angle performance and create a privacy function. The image processing algorithms for achieving privacy may enable better privacy when used in conjunction with Normal Drive.

An LCD with a pixel electrode structure, such as that shown in FIG. 5, is compatible with beam steering optics, such as a parallax barriers, micro-lenses etc to enable a direction display, such as a 3D display. If the beam steering optics are switchable to enable a 2D mode and a 3D mode, then it may be preferable that the Analogue Multi-Pixel Drive (as shown in FIG. 7 and FIG. 9) is used to realise the 2D mode (beam steering optics inactivated) and the Normal Drive (as shown in FIG. 6 and FIG. 8) is used to realise the 3D mode (beam steering optics activated).

Analogue Multi-Pixel Drive may be used in conjunction with non-nematic LC phases to improve viewing angle performance.

Analogue Multi-Pixel Drive may be used in conjunction with optical compensation films, such as a negative C-plate or positive A-plate, in order to further improve viewing angle performance of an LCD.

Analogue Multi-Pixel Drive may be used in conjunction with image processing algorithms, (such as those disclosed in U.S. Pat. No. 6,801,220 and U.S. Pat. No. 5,847,688) in order to further improve viewing angle performance of an LCD (although, as described above, such use of image processing algorithms will lead to a loss of resolution).

In general, any LC mode that achieves variable light modulation by tilting the LC molecules by a pre-determined amount in a plane perpendicular to the plane of the substrates 11, 21 (i.e. an out-of-plane switching LC mode (out-of-plane switching mode)) may have improved viewing angle performance using the Analogue Multi-Pixel Drive described herein compared with Normal Drive. Analogue Multi-Pixel Drive may be used to improve the viewing angle performance of out-of-plane switching LC modes (out-of-plane switching modes) that include, but not limited to, Twisted Nematic (TN), Super Twisted Nematic (STN), Electrically Controlled Birefringence (ECB), Optically Compensated Birefringence (OCB or "pi-cell") and Vertically Aligned Nematic (VAN).

The embodiments described above relate to display devices that use out-of-plane switching liquid crystal modes (out-of-plane switching modes)—that, a liquid crystal mode that achieves variable light modulation by tilting the LC molecules by a pre-determined amount in a plane perpendicular to the plane of the substrates. However the invention is not limited to this and, in general, any LC mode that achieves variable light modulation by twisting the LC molecules by a pre-determined amount in a plane parallel to the plane of the substrates 11, 21 (i.e. an in-plane switching LC mode) may have improved viewing angle performance using the Analogue Multi-Pixel Drive described herein compared with Normal Drive.

The embodiments described above relate to display devices that use monostable liquid crystal modes. However the invention is not limited to this and, in general, any non-ferroelectric, out-of-plane bistable LC mode may have improved greyscale control using the Analogue Multi-Pixel Drive described herein compared with Normal Drive. For example, a Zenithal Bistable Display (ZBD) that using a bistable grating surface to create a bistable LC mode from an intrinsically monostable LC material may have improved greyscale control using Analogue Multi-Pixel Drive compared with Normal Drive. The Zenithal Bistable Display (ZBD) is significantly more robust to mechanical shocks than a bistable ferroelectric display.

The embodiments described above relate to devices that use an electro-optical material that is a liquid crystal material. However, the invention is in principle not limited to this, and any suitable electro-optical material may be used.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

The first, second and third voltages may be selected such that the voltage applied across the electro-optical material in the first region of the pixel is lower than a threshold switching voltage of the electro-optical material and the voltage applied across the electro-optical material in the second region of the pixel is greater than the saturation switching voltage. In general, an electro-optical material does not undergo a sharp transition from its unswitched state to its fully switched state. Often, an electro-optical material will start to switch from its unswitched state when the magnitude of the applied voltage across the electro-optical material reaches a first threshold, but will not switch to the fully-switched state until the magnitude of the applied voltage across the electro-optical material reaches a saturation voltage (which is greater than the threshold voltage). When the magnitude of the applied voltage across the electro-optical material is greater than the threshold voltage but is less than the saturation voltage, the electro-optical material is in a partially switched state.

The first region of the pixel may be maximally light-transmissive and the second region of the pixel may be maximally light-absorbing. This corresponds to the case of a "normally white" display, in which a pixel has its greatest transmissivity in the absence of an applied voltage across the pixel, and application of a voltage across the pixel results in a reduction in the transmissivity of the pixel.

Alternatively, the first region of the pixel may be maximally light-absorbing and the second region of the pixel may be maximally light-transmissive. This corresponds to the case of a "normally black" display, in which a pixel has its lowest transmissivity in the absence of an applied voltage across the pixel, and application of a voltage across the pixel results in an increase in the transmissivity of the pixel.

For convenience, the terms "white" and "black" will be used in place of "maximally light-transmissive" and "maximally light-absorbing".

The electro-optical material may be configured in an out-of-plane switching mode.

The electro-optical material is a monostable electro-optical material. As is known, a "monostable" electro-optical display mode is one which, if a sufficient voltage is applied to switch the electro-optical material to its fully switched state, will relax back to the unswitched state when the voltage across the electro-optical material is reduced below the threshold voltage. It should however be noted that the invention may in principle also be applied to some bistable electro-optical materials and bistable display devices. An LC material can be intrinsically monostable but made to behave in a bistable fashion via other technologies, such as surface alignment techniques, so that a bistable display device may be implemented with an intrinsically monostable electro-optical material or an intrinsically bistable electro-optical material.

The controller may be adapted to, for a pixel of the display, apply the first voltage, second voltage and third voltage so as to define at least two of the first region, the second region and the third region in the pixel thereby to obtain a greyscale level for the pixel that is intermediate a maximally transmissive state greyscale level and a minimally transmissive state greyscale level. It should be understood that not every greyscale level will require that a pixel includes the first region, the second region and the third region. For example, for the brightest ("white") greyscale level a pixel will include only the first region or the third region (depending on whether the display is a normally-white display or a normally back display)—i.e., the pixel will include only one region which extends over the entire active area of the pixel. For the darkest ("black") greyscale level a pixel will include only the first region or the third region (depending on whether the display is a normally-white display or a normally back display)—i.e., the pixel will include only one region which extends over the entire active area of the pixel. For an intermediate greyscale level (i.e., for a greyscale level that is not the brightest greyscale level or the darkest greyscale level), a pixel will generally include at least two of the first, second and third regions—for example an intermediate greyscale level may be obtained if a pixel includes the first region and the third region, if the pixel includes the second region and the third region, or if the pixel includes the first, second and third regions. Alternatively, an intermediate greyscale level may be obtained if the third region (partially switched region) occupies the entire pixel area. This is explained in more detail in the description of the preferred embodiments.

Furthermore, the controller may be adapted to, for a pixel of the display, apply the first voltage, second voltage and third voltage so as to define each of the first region, the second region and the third region in the pixel thereby to obtain a greyscale level for the pixel that is intermediate a maximally transmissive state greyscale level and a minimally transmissive state greyscale level. Typically, this will produce an intermediate greyscale level that is significantly darker than the brightest greyscale level but that is significantly brighter than the darkest greyscale level produces. For a particular display device, greyscale levels that include all of the 3 different (unswitched, fully switched and partially switched) regions are likely to occupy a relative narrow range in terms of % maximum transmissivity—however, this narrow range may differ from one display device to another, and may occur anywhere within the range from 15% to 85% of the maximum transmissivity The electro-optical material may be a liquid crystal material.

The liquid crystal material may be configured in one of a Twisted Nematic liquid crystal mode, Super Twisted Nematic liquid crystal mode, Electrically Controlled Birefringence liquid crystal mode, Optically Compensated Birefringence liquid crystal mode and Vertically Aligned Nematic liquid crystal mode.

The resistivity of the resistive layer may be non-uniform over the resistive layer. In practice, it is likely that a region in which the electro-optical material is partially switched will exist between the first region (in which the electro-optical material is not switched and so remains in its zero-voltage state) and the second region (in which the electro-optical material is fully switched). Use of a resistive layer that has a resistivity that is non-uniform may reduce the extent of such a region in which the electro-optical material is partially switched.

The resistivity of the resistive layer may vary along a direction from the first electrode to the second electrode.

At least one pixel of the display may be a multi-domain pixel containing two or more domains of different liquid crystal alignment.

The domains of the multi-domain pixel may extend parallel or generally parallel to one another between the first electrode of the pixel and the second electrode of the pixel. This ensures that the proportion of a domain in which the liquid crystal is switched from its zero-voltage state will be approximately the same for all domains of the pixel.

At least one pixel of the display, and optionally all pixels, may comprise a reflective region. This provides a transflective pixel that can use ambient light and so reduce or even eliminate the need to provide light from a backlight.

The reflective portion of a pixel may extend parallel or generally parallel to and adjacent to the first electrode or the second electrode. This ensures that, as the voltages applied to the first, second and counter electrodes of the pixel are controlled to increase the voltage applied across the pixel, the portion of liquid crystal overlying the reflector is either the first of the liquid crystal in the pixel to be switched or is the last of the liquid crystal in the pixel to be switched. Arranging for the portion of liquid crystal overlying the reflector to be the last of the liquid crystal in the pixel to be switched would be advantageous in the case of, for example, a normally white display in high ambient illumination, as this would allow the pixel to make use of the ambient for most greyscale values (ie, except for the very darkest greyscale values). Conversely, in a case of a normally white display in low ambient illumination it would be advantageous for the portion of liquid crystal overlying the reflector to be the first of the liquid crystal in the pixel to be switched, since this portion of the liquid crystal will not significantly contribute to the overall pixel luminance (which will be primarily determined by the transmission of light from the backlight though the part of the pixel where the reflector is not provided).

The pixels may be arranged in rows and columns. The first and second electrodes may extend parallel or generally parallel to the rows of pixels, or alternatively the first and second electrodes may extend parallel or generally parallel to the columns of pixels.

In a second mode, the controller may be adapted to, for at least one pixel, apply a first voltage to the first electrode of the pixel and apply a second voltage equal to the first voltage to the second electrode of the pixel. A display of this embodiment is able to be driven using the Analogue Multi-Pixel Drive of the present invention, or using conventional Normal Drive.

In the second mode, the controller may apply voltages such that, for every pixel of the plurality of pixels, the voltage applied to the first electrode of the pixel is the same as the voltage applied to the second electrode of the pixel—so that in the second mode every pixel of the plurality of pixels is driven using the conventional Normal Drive.

Alternatively, in the second mode, the controller may apply voltages such that, for every pixel of a first group of pixels, the voltage applied to the first electrode of the pixel is different to the voltage applied to the second electrode of the pixel and such that, for every pixel of a second group of pixels, the voltage applied to the first electrode of the pixel is the same as the voltage applied to the second electrode of the pixel. The pixels of the first group provide a region of the display that is driven using the Analogue Multi-Pixel Drive of the present invention, and pixels of the second group provide a region of the display that is driven using conventional Normal Drive.

INDUSTRIAL APPLICABILITY

A liquid crystal display with improved viewing angle performance that is suitable for mobile phones, handheld games consoles, tablets, portable PCs, televisions etc.

The invention claimed is:

1. A display comprising:
    a first substrate;
    a second substrate spaced from the first substrate;
    an image display layer disposed between the first substrate and the second substrate and comprising an electro-optical material, the electro-optical material not being a ferro-electric electro-optical material; and
    a controller;
    wherein the display comprises a plurality of independently addressable pixels, a pixel of the plurality of pixels comprising:
        a first electrode and a second electrode disposed on the first substrate, the first electrode being spaced from the second electrode in a direction parallel to a plane of the first substrate;
        a resistive layer disposed on the first substrate and electrically connected to the first electrode and to the second electrode; and
        another electrode disposed on the second substrate;
    the controller, in a first mode, being adapted to, for a pixel of the display, apply a first voltage to the first electrode of the pixel, apply a second voltage different to the first voltage to the second electrode of the pixel and apply a third voltage to the other electrode of the pixel to define in the pixel at least one of a first region in which the electro-optical material is in an unswitched state, a second region in which the electro-optical material is in a fully switched state and a third region in which the electro-optical material is in a partially switched state, the first, second and third voltages being selected such that an area of the first region, second region and third region or each of the first region, second region and third region defined in the pixel produces a desired greyscale level for the pixel,
    wherein the first region of the pixel is maximally light-transmissive and the second region of the pixel is maximally light-absorbing, or the first region of the pixel is maximally light-absorbing and the second region of the pixel is maximally light-transmissive.

2. A display as claimed in claim 1 wherein the first, second and third voltages are selected such that the voltage applied across the electro-optical material in the first region of the pixel is lower than a threshold switching voltage of the electro-optical material and the voltage applied across the electro-optical material in the second region of the pixel is equal to or greater than a saturation switching voltage.

3. A display as claimed in claim 1 wherein the electro-optical material is configured in an out-of-plane switching mode.

4. A display as claimed in claim 1 wherein the electro-optical material is a monostable electro-optical material.

5. A display as claimed in claim 1 wherein the controller is adapted to, for a pixel of the display, apply the first voltage, second voltage and third voltage so as to define at least two of the first region, the second region and the third region in the pixel thereby to obtain a greyscale level for the pixel that is intermediate a maximally transmissive state greyscale level and a minimally transmissive state greyscale level.

6. A display as claimed in claim 1 wherein the electro-optical material is a liquid crystal material.

7. A display as claimed in claim 6 wherein the liquid crystal material is configured in an out-of-plane switching mode, and wherein the liquid crystal material is configured in one of a Twisted Nematic liquid crystal mode, Super Twisted Nematic liquid crystal mode, Electrically Controlled Birefringence liquid crystal mode, Optically Compensated Birefringence liquid crystal mode and Vertically Aligned Nematic liquid crystal mode.

8. A display as claimed in claim 1 wherein a resistivity of the resistive layer is non-uniform over the resistive layer.

9. A display as claimed in claim 8 wherein the resistivity of the resistive layer varies along a direction from the first electrode to the second electrode.

10. A display as claimed in claim 1 wherein at least one pixel of the display is a multi-domain pixel containing two or more domains of different liquid crystal alignment.

11. A display as claimed in claim 10 wherein the domains of the multi-domain pixel extend parallel or generally parallel to one another between the first electrode of the pixel and the second electrode of the pixel.

12. A display as claimed in claim 1 wherein at least one pixel of the display comprises a reflective region.

13. A display as claimed in claim 12 wherein the reflective region extends parallel or generally parallel to and adjacent to the first electrode or the second electrode.

14. A display as claimed in claim 1 wherein the pixels are arranged in rows and columns, and the first and second electrodes extend parallel or generally parallel to the rows of pixels.

15. A display as claimed in claim 1 wherein the pixels are arranged in rows and columns, and the first and second electrodes extend parallel or generally parallel to the columns of pixels.

16. A display as claimed in claim 1 wherein, in a second mode, the controller is adapted to, for at least one pixel, apply a first voltage to the first electrode of the pixel and apply a second voltage equal to the first voltage to the second electrode of the pixel.

* * * * *